US008164722B2

(12) United States Patent
Ohmuro et al.

(10) Patent No.: US 8,164,722 B2
(45) Date of Patent: Apr. 24, 2012

(54) LIQUID-CRYSTAL DISPLAY DEVICE WITH AT LEAST THREE OPTICALLY-ANISOTROPIC LAYERS HAVING FORMULATED IN-PLANE RETARDATIONS

(75) Inventors: Katsufumi Ohmuro, Minami-ashigara (JP); Shun Nakamura, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 323 days.

(21) Appl. No.: 12/664,459

(22) PCT Filed: Jun. 12, 2008

(86) PCT No.: PCT/JP2008/061173
§ 371 (c)(1),
(2), (4) Date: Dec. 14, 2009

(87) PCT Pub. No.: WO2008/153201
PCT Pub. Date: Dec. 18, 2008

(65) Prior Publication Data
US 2010/0188616 A1     Jul. 29, 2010

(30) Foreign Application Priority Data

Jun. 15, 2007    (JP) ................. 2007-158313
May 30, 2008    (JP) ................. 2008-142053

(51) Int. Cl.
*G02F 1/1335*      (2006.01)
(52) U.S. Cl. ........ 349/119; 349/117; 349/118; 349/120; 349/121
(58) Field of Classification Search .............. 349/96, 349/105, 117–121
See application file for complete search history.

(56) References Cited

U.S. PATENT DOCUMENTS

| 4,583,825 | A | | 4/1986 | Buzak |
| 5,410,422 | A | | 4/1995 | Bos |
| 5,528,400 | A | * | 6/1996 | Arakawa ................. 349/117 |
| 5,568,290 | A | * | 10/1996 | Nakamura .............. 349/96 |
| 5,883,685 | A | | 3/1999 | Mazaki et al. |
| 6,671,017 | B2 | | 12/2003 | Lyu et al. |
| 7,495,730 | B2 | | 2/2009 | Hisakado et al. |
| 2007/0184212 | A1 | * | 8/2007 | Nimura et al. ........... 428/1.31 |
| 2008/0075922 | A1 | * | 3/2008 | Ueda ...................... 428/156 |
| 2008/0137014 | A1 | * | 6/2008 | Toyama et al. .......... 349/119 |

FOREIGN PATENT DOCUMENTS

| JP | 9-197397 A | 7/1997 |
| JP | 9-211444 A | 8/1997 |

(Continued)

OTHER PUBLICATIONS

International Search Report for PCT/JP2008/061173 completed Jul. 16, 2008.

(Continued)

*Primary Examiner* — Hoan C Nguyen
(74) *Attorney, Agent, or Firm* — Buchanan Ingersoll & Rooney PC

(57) ABSTRACT

A liquid-crystal display device comprising a liquid-crystal cell and at least three optically-anisotropic layers disposed on each side of the liquid crystal cell, wherein they are combined so that the Δnd value of the liquid-crystal cell and the optical characteristics of the optically-anisotropic layers can satisfy predetermined relationships, is disclosed.

11 Claims, 5 Drawing Sheets

FOREIGN PATENT DOCUMENTS

| | | |
|---|---|---|
| JP | 2002-40429 A | 2/2002 |
| JP | 2003-232922 A | 8/2003 |
| JP | 2006-243179 A | 9/2006 |
| JP | 2006-293275 A | 10/2006 |
| WO | WO 96/37804 A1 | 11/1996 |
| WO | WO 2006/095928 A1 | 9/2006 |

OTHER PUBLICATIONS

Written Opinion for PCT/JP2008/061173 completed Jul. 16, 2008.
English translation of International Search Opinion issued in corresponding International Application No. PCT/JP2008/051173 dated Dec. 30, 2009.

* cited by examiner

Fig. 4
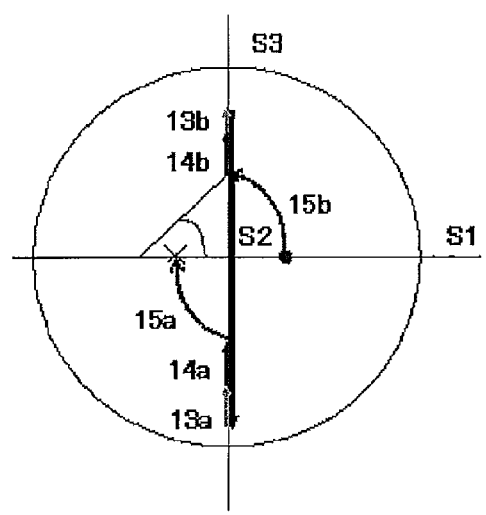
Fig. 4A
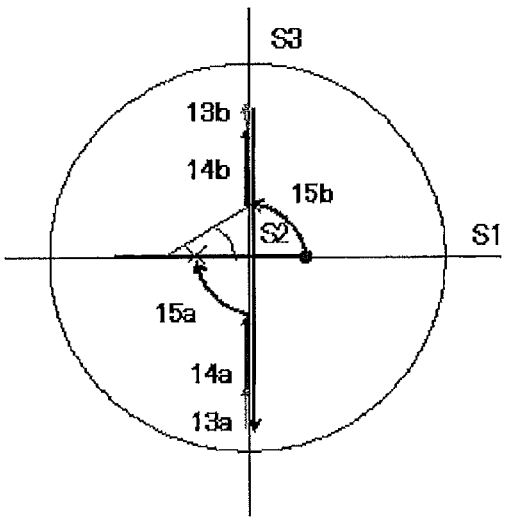
Fig. 4B
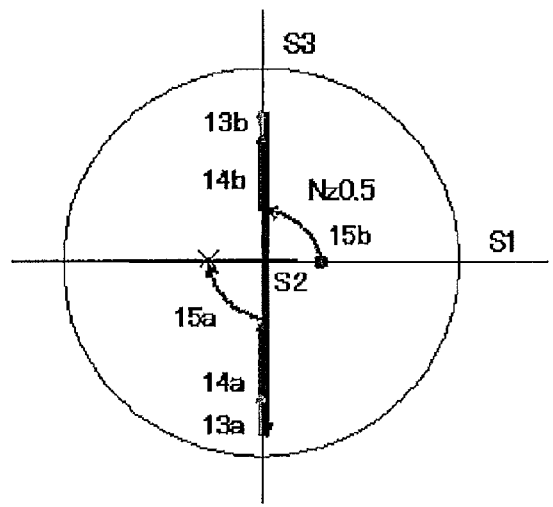
Fig. 4C
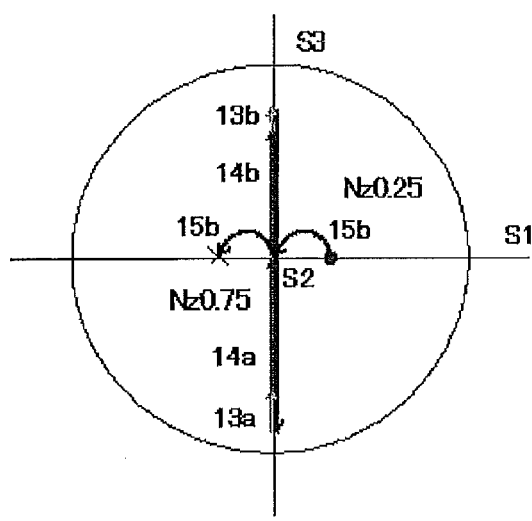
Fig. 4D

LIQUID-CRYSTAL DISPLAY DEVICE WITH AT LEAST THREE OPTICALLY-ANISOTROPIC LAYERS HAVING FORMULATED IN-PLANE RETARDATIONS

BACKGROUND OF THE INVENTION

1. Technical Field of the Invention

The present invention relates to a liquid-crystal display device, especially to a bend alignment or vertical alignment-mode liquid-crystal display device.

2. Related Art

There has been proposed a liquid-crystal display device (LCD) comprising a bend alignment-mode liquid-crystal cell, in which rod-like liquid-crystal molecules are aligned substantially in opposite directions (symmetrically) in the upper part and the lower part of the liquid-crystal cell (see U.S. Pat. No. 4,583,825 and U.S. Pat. No. 5,410,422). The bend alignment mode is characterized in that, as compared with general liquid-crystal modes such as TN mode and STN mode, the viewing angle is broad and the response speed is high. In addition, since the bend alignment-mode liquid-crystal cell has a self-optical compensatory function, it is referred to as an OCB (optically compensatory bend) liquid-crystal mode.

As a bend alignment-mode liquid-crystal display device improved in terms of viewing angle characteristics, there has been proposed a bend alignment-mode liquid-crystal display device comprising an optical film having an optically-anisotropic layer formed by the use of a discotic compound (see JPA No. hei 9-197397 and WO96/37804).

However, when such an optical film having an optically-anisotropic layer formed by the use of a discotic compound is used for viewing angle compensation in a bend alignment-mode liquid-crystal display device, it has been pointed out that light at a specific wavelength may leak out to cause coloration of display images (see JPA No. hei 11-316378).

Various methods have been proposed for reducing the color shift and for preventing gray scale inversion in a bend alignment-mode liquid-crystal display device that comprises an optical film having an optically-anisotropic layer formed by the use of a discotic compound (see Japanese Patent No. 3056997, JPA Nos. 2002-40429 and 2006-243179).

Recently, the use of liquid-crystal display devices has been expanded and, for example, they are being used even in car navigation systems, instrumental panels, game appliances in rear seats, and head-up displays.

Accordingly, in these applications, bend alignment-mode liquid-crystal displays are required to exhibit a broader latitude for gradation display and are also required to exhibit a further improved transmittance.

For improving the transmittance of liquid-crystal display devices, there are known a method of increasing $\Delta nd$ of a liquid-crystal cell, and a method of increasing Rth of an optical film (see JPA Nos. hei 9-211444 and 2006-243179).

However, in the method of increasing $\Delta nd$ of a liquid-crystal cell, the optical characteristics of the optical film may be optimized in accordance with the value of $\Delta nd$ of the liquid-crystal cell.

In the method of increasing Rth of an optical film, when an additive capable of expressing the optical characteristic is added, then the additive may bleed out and the haze may increase. With that, the production latitude may decrease and the method is difficult to realize.

In the above, a bend alignment mode is mainly described, but vertical alignment-mode liquid-crystal display devices have the same problems as above.

SUMMARY OF THE INVENTION

An object of the present invention is to provide a liquid-crystal display device, especially a bend alignment-mode or vertical alignment-mode liquid-crystal display device, that has a simple constitution, a high transmittance and excellent viewing angle characteristics without lowering the production latitude thereof.

The present inventors have assiduously studied and, as a result, have found that a liquid-crystal display device comprising a liquid-crystal cell and at least three optically-anisotropic layers disposed on each side of the liquid crystal cell, wherein they are combined so that the $\Delta nd$ value of the liquid-crystal cell and the optical characteristics of the optically-anisotropic layers can satisfy predetermined relationships, can achieve the above-mentioned object. And on the basis of this finding, the inventors have further studied and have made the present invention.

In one aspect, the present invention provides a liquid-crystal display device comprising:

a liquid-crystal cell comprising a pair of transparent substrates and a liquid-crystal layer, disposed between said pair of transparent substrates, comprising liquid-crystal molecules; and a first optically-anisotropic layer, a second optically-anisotropic layer, a third optically-anisotropic layer and a polarizing element as disposed on each side of the liquid-crystal cell in this order from the liquid-crystal cell;

which satisfies the following conditions (1) to (6):

(1) $\Delta nd$, where $\Delta n$ is birefringence of the liquid-crystal layer under no driving voltage application thereto, and d is the thickness (nm) of the liquid-crystal layer, satisfies 500 nm<$\Delta nd$<1300 nm;

(2) the first optically-anisotropic layer comprises molecules aligned in the direction determined by an alignment axis and fixed in an alignment state, and the angle between the projection axes of the alignment axis and the transmission axis of either of said pair of polarizing elements, as projected on one plane, is from 40° to 50°;

(3) in-plane retardation (Re) of the first optically-anisotropic at a wavelength of 550 nm is from 20 to 50 nm;

(4) in-plane retardation, Re[+40°], of the first optically-anisotropic layer, as measured in a first direction inclined at 40° toward the layer plane of the first optically-anisotropic layer relative to the normal line of the layer, and in-plane retardation, Re[−40°], of the first optically anisotropic layer, as measured in a second direction inclined at 40° oppositely toward the layer plane of the first optically-anisotropic layer relative to the normal line of the layer from, satisfy the following formula (II) or (II'):

when Re[+40°]>Re[−40°] is satisfied, $$3 \leq Re[+40°]/Re[-40°] \leq 20 \quad (II)$$

when Re[+40°]<Re[−40°] is satisfied, $$3 \leq Re[-40°]/Re[+40°] \leq 20 \quad (II');$$

where the first and second directions are directions in a same plane that includes both of the normal line to the first optically anisotropic layer and an in-plane direction at 90° relative to the slow axis of in-plane retardation of the first optically-anisotropic layer;

(5) in-plane retardation (Re) of the second optically-anisotropic layer at a wavelength of 550 nm satisfies 0<|Re|≦40 nm, and the thickness-direction retardation (Rth) thereof at a wavelength of 550 nm satisfies 0 nm<Rth<(Δnd of liquid-crystal layer)/2;

(6) in-plane retardation (Re) of the third optically-anisotropic layer at a wavelength of 550 nm satisfies 0<|Re|≦300 nm, and the thickness-direction retardation (Rth) thereof at a wavelength of 550 nm satisfies −100 nm<Rth<(Δnd of liquid-crystal layer)/2.

In the invention, at least one of the first, second and third optically-anisotropic layers may comprise two or more optically-anisotropic layers.

As embodiments of the invention, there are provided the liquid-crystal display device, wherein the total of Rth of the second and third optically-anisotropic layers disposed on one side of the liquid-crystal cell is not more than Δnd of the liquid-crystal layer; and the liquid-crystal display device, wherein Re at a wavelength of 550 nm of the second optically-anisotropic layer disposed on one side of the liquid-crystal cell is not more than Re at a wavelength of 550 nm of the third optically-anisotropic layer.

In one embodiment of the invention, the first optically-anisotropic layer may comprise discotic liquid crystals and/or rod-like liquid crystals fixed in a hybrid alignment state.

In one embodiment of the invention, the first optically-anisotropic layer may comprise at least one non-liquid-crystal polymer selected from a group consisting of polyamides, polyesters, polyether ketones, polyamidimides and polyester imides.

In one embodiment of the invention, at least one of the second and third optically-anisotropic layers may be a cellulose acylate film, a cyclic olefin copolymer (COC) film, or a cyclic olefin polymer (COP) film.

The liquid-crystal cell may be a bend alignment-mode or vertical alignment-mode liquid-crystal cell.

The first, second and third optically-anisotropic layers and the polarizing element may be disposed as integrated as an elliptically polarizing plate; and the elliptically polarizing plate may be produced by sticking a rolled-up laminate of the polarizer and the third optically-anisotropic layer, and a rolled-up laminate of the first and second optically-anisotropic layers, in a mode of roll-to-roll processing operation.

The liquid-crystal display device of the invention may further comprise a front scattering layer on the outer side of the polarizing element disposed on the displaying side.

BRIEF DESCRIPTION OF THE DRAWINGS

FIG. 4 is a view used for explaining other examples of the optical compensatory mechanism of a liquid-crystal display device the invention, on a Poincare sphere.

Figure 1:
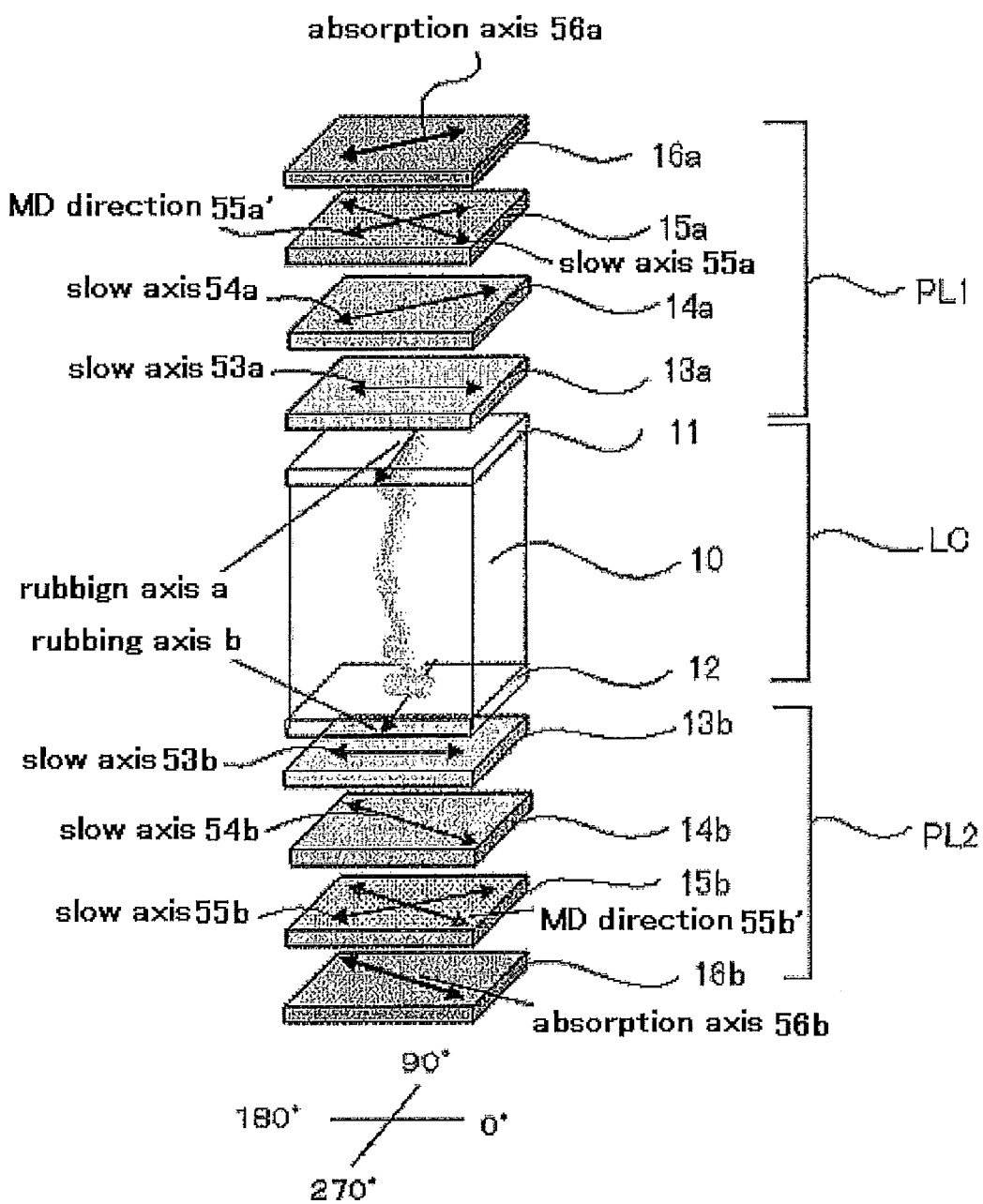
FIG. 1 is a graphic view of one example of a liquid-crystal display device of the invention.

In the drawings, the reference numerals and signs have the following meanings:

| | |
|---|---|
| 10 | Liquid-Crystal Layer |
| 11, 12 | Liquid-Crystal Cell Substrate |
| 13a, 13b | First Optically-Anisotropic Layer |
| 14a, 14b | Second Optically-Anisotropic Layer |
| 15a, 15b | Third Optically-Anisotropic Layer |
| 16a, 16b | Polarizing Element |
| LC | Liquid-Crystal Cell |
| PL1, PL2 | Elliptically-Polarizing Plate |

PREFERRED EMBODIMENT OF THE INVENTION

The liquid-crystal display device of the invention is described in detail hereinunder.

In the description of embodiments of the invention, "45°", "parallel to", "perpendicular to" or the like mean to fall within a range of the precise angle ± less than 5°. The error from the precise angle is preferably less than 4°, more preferably less than 3°.

Regarding the angle, "+" means in the clockwise direction, and "−" means in the counterclockwise direction.

In the description, "Slow axis" means the direction in which the refractive index is the largest; and "visible light region" means from 380 to 780 nm.

The wavelength for refractive index measurement is in a visible light region (λ=550 nm) unless otherwise specifically indicated.

In the description of the embodiments, "polarizer" is meant to include both a long continuous polarizer and a polarizer sheet as cut to have a size capable of being incorporated in liquid-crystal displays. In the description, "cut" as referred to herein is meant to include "blanking" and "shearing".

In the description, "polarizing element" is differentiated from "polarizer". "Polarizer is meant to indicate a laminate that comprises a "polarizing element" and, as formed on at least one surface thereof, a transparent protective film to protect the polarizing element.

In the description of the embodiments, "molecular symmetric axis" is meant to indicate a rotary symmetric axis, if any present in the molecule. However, it is not required that the molecule has rotary symmetry in a strict sense.

In general, the molecular symmetric axis of a discotic liquid crystal compound coincides with the axis passing through the center of the discotic surface perpendicular to the discotic surface. The molecular symmetric axis of a rod-like liquid crystal compound coincides with the major axis of the molecule.

In the description, $Re(\lambda)$ and $Rth(\lambda)$ each indicate the in-plane retardation (unit: nm) and the thickness direction retardation (unit: nm) at a wavelength λ. $Re(\lambda)$ is measured by applying a light having a wavelength of 2 nm in the normal direction of a sample such as a film or a layer, using KOBRA-21ADH or WR (by Oji Scientific Instruments).

When the sample to be tested is represented by an uniaxial or biaxial refractive index ellipsoid, then its $Rth(\lambda)$ is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), $Re(\lambda)$ of the sample is measured at 6 points in all thereof, up to +50° relative to the normal direction of the sample at intervals of 10°, by applying a light having a wavelength of λ nm from the inclined direction of the sample.

With the in-plane slow axis from the normal direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (11) and (12):

$$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (11)$$

$$Rth = \{(nx+ny)/2 - nz\} \times d \quad (12)$$

wherein Re(θ) means the retardation value of the sample in the direction inclined by an angle θ from the normal direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the description, when there is no notation regarding the measurement wavelength, the measurement wavelength for Re or Rth is 550 nm.

A graphic cross-sectional view of one example of a liquid-crystal display device of the invention is shown in FIG. 1. In FIG. 1, when the axial direction is expressed by means of angles, it is based on the direction shown at the bottom of FIG. 1.

The liquid-crystal display device shown in FIG. 1 comprises an OCB-mode liquid-crystal cell LC and, with the liquid-crystal cell LC being the center thereof, the device is so designed that first optically-anisotropic layers 13a and 13b, second optically-anisotropic layers 14a and 14b, third optically-anisotropic layers 15a and 15b and polarizing elements 16a and 16b are symmetrically disposed relative to the center LC. The first optically-anisotropic layers 13a and 13b, the second optically-anisotropic layers 14a and 14b, the third optically-anisotropic layers 15a and 15b and the polarizing elements 16a and 16b may be incorporated in the liquid-crystal display device as integrated elliptically-polarizing plates PL1 and PL2 Needless-to-say, the members may be incorporated therein all as individual ones, or as combined structures of some of those individual members, for example, as optical compensatory films comprising the first optically-anisotropic layer 13a/13b and the second optically-anisotropic layer 14a/14b, and elliptically polarizing plates having the third optically-anisotropic layer 15a/15b and the polarizing element 16a/16b.

The liquid-crystal cell LC is an OCB-mode liquid-crystal cell, comprising upper and lower substrates 11 and 12 and a liquid-crystal layer 10 between them. On the inner surface of the substrates 11 and 12, formed are an alignment film, a transparent electrode, color filter and others, but these are not shown in the drawing. The alignment film formed on the inner surface of the substrates 11 and 12 is rubbed along the rubbing axis a, b in the direction of about 270°, and the alignment of the liquid-crystal molecules under no driving voltage application thereto is thereby controlled. Δnd of the liquid-crystal layer (Δn is birefringence of the liquid-crystal layer under no driving voltage application thereto, and d is the thickness (nm) of the liquid-crystal layer) satisfies 500 nm<Δnd<1300 nm. Preferably, Δnd is from 800 nm to less than 1200 nm. Under no driving voltage application thereto, the liquid-crystal molecules near the substrate surface are aligned nearly horizontally relative to the substrate surface (pretilt angle, about 5 to 7°) with the major axis of each molecule along the rubbing axis a, b.

The basic constitution of an OCB-mode liquid-crystal cell is described in U.S. Pat. Nos. 4,583,525 and 5,410,422. An OCB mode enables rapid response driving, and therefore a field sequential driving system is preferably used.

The polarizing elements 16a and 16b are disposed so that their absorption axes 56a and 56b are perpendicular to each other. Preferably, one of the absorption axes 56a and 56b is in the direction of about 45° and the other is in the direction of about 135°. Not shown in the drawing, the polarizing elements 16a and 16b each may have a protective film such as a cellulose acylate film on the outer surface thereof.

In the first optically-anisotropic layers 13a and 13b, molecules are aligned in the direction determined by the alignment axis (not shown), and are fixed in the alignment state. The in-plane slow axis 53a, 53b of the first optically-anisotropic layer 53a, 53b is determined by the alignment axis. The alignment axis (not shown, but this is perpendicular to the absorption axis 16a, 16b) and the transmission axis 56a, 56b of the polarizing element 16a, 16b are disposed so that the angle between their projection axes on the same plane are from 40° to 50°. The value of Re(550) of the first optically-anisotropic layer 13a, 13b is from 20 to 50 nm.

In-plane retardation, Re[+40°], of the first optically-anisotropic layer 13a, 13b, as measured in the first direction inclined at 40° toward the plane of the first optically-anisotropic layer 13a, 13b relative to the normal line of the layer, and in-plane retardation, Re[−40°], of the layer, as measured in the second direction inclined at 40° oppositely toward the plane of the first optically-anisotropic layer 13a, 13b relative to the normal line of the layer, satisfy the following formula (II) or (II'):

when Re[+40°]>Re[−40°] is satisfied, $$3 \leq Re[+40°]/Re[-40°] \leq 20 \tag{II}$$

when Re[+40°]<Re[−40°] is satisfied, $$3 \leq Re[-40°]/Re[+40°] \leq 20 \tag{II'}$$

Figure 2:
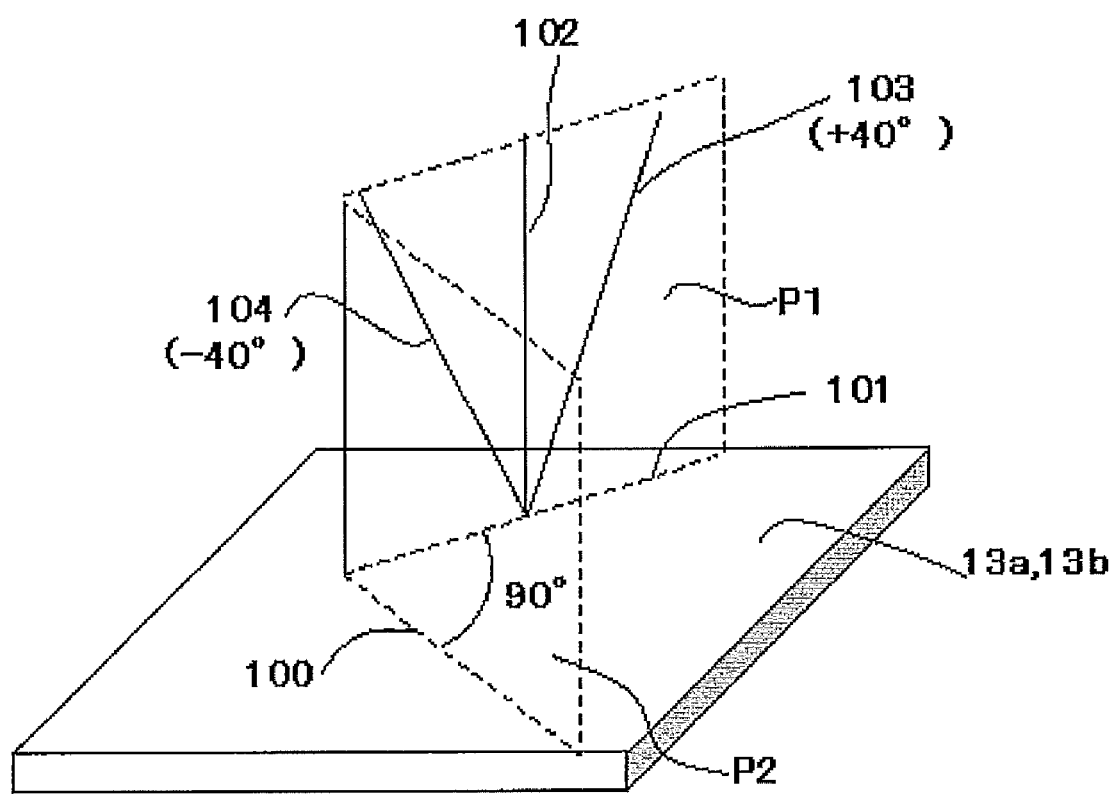
FIG. 2 is a graphic view for explaining the directions for measuring Re[+40°] and Re[−40°].

The two, first and second, directions for measuring Re[+40°] and Re[−40°] are decided in the manner shown in FIG. 2. A plane "P1" is decided so that it includes the normal line 102 of the first optically anisotropic layer 13a or 13b and an in-plane direction 101 at 90° relative to the in-plane direction 100, which is the direction of the in-plane slow axis of the first optically-anisotropic layer 13a or 13b, provided that the refractive index of the first optically anisotropic layer 13a or 13b in the direction 101 is smaller than that in the direction 100. The value of Re[+40°] is measured in the first direction 103 inclined at +40° toward the plane of the first optically-anisotropic layer 13a or 13b relative to the normal line 102 in the plane P1; and the value of Re[−40°] is measured in the second direction 104 inclined at −40° toward the plane of the first optically-anisotropic layer 13a or 13b relative to the normal line 102 in the plane P1.

One example of the first optically-anisotropic layer 13a, 13b that satisfies the above formula (II) or (II') is an optically-anisotropic layer formed of a liquid-crystal composition containing a discotic liquid crystal or rod-like liquid crystal, in which the liquid-crystal molecules are fixed in a hybrid alignment state with the tilt angles of the molecular symmetric axes relative to the layer surface varying in the thickness direction of the layer. In general, when a liquid crystal composition is used for preparing an optically anisotropic layer, an alignment layer is used. Such an alignment layer may be subjected to a rubbing treatment along a rubbing axis. The alignment axis of the first optically anisotropic layer, prepared by using such an alignment layer, is the rubbing axis. According to such embodiments, the slow axis (in FIG. 1, 53a or 53b) of the first optically anisotropic layer is perpendicular to the rubbing axis.

Of the second optically-anisotropic layer 14a, 14b, in-plane retardation (Re) at a wavelength of 550 nm satisfies 0<|Re|≦40 nm; and the thickness-direction retardation (Rth) thereof at a wavelength of 550 nm satisfies 0 nm<Rth<(Δnd of the liquid-crystal layer)/2.

The second optically-anisotropic layer 14a, 14b is disposed so that the in-plane slow axis 54a, 54b is parallel to the absorption axis 56a, 56b of the polarizing element 16a, 16b.

Of the third optically-anisotropic layer 15a, 15b, in-plane retardation (Re) at a wavelength of 550 nm satisfies 0<|Re|≦300 nm; and thickness-direction retardation (Rth) thereof at a wavelength of 550 nm satisfies −100 nm<Rth<(Δnd of the liquid-crystal layer)/2. The MD direction 55a', 55b' of the third optically-anisotropic layer 15a, 15b is the machine direction in production of the polymer film for the third optically-anisotropic layer 15a, 15b, and this corresponds to the long axis of the film. The in-plane slow axis 55a, 55b of the third optically-anisotropic layer 15a, 15b may be the same as the MD direction 55a', 55b', or may not be the same. In the embodiment in which the third optically-anisotropic layer 15a, 15b is a polymer film, the direction of the in-plane slow axis 55a, 55b of the layer may be adjusted to the desired direction by controlling the stretching direction and the stretching ratio in the stretching step.

When the total of Rth of the second optically-anisotropic layer 14a and that of the third optically-anisotropic layer 15a, as well as the total of Rth of the second optically-anisotropic layer 14b and that of the third optically-anisotropic 15b is not larger than ½ of Δnd of the liquid crystal layer 10, it is preferable since the viewing angle characteristics of the device may be more improved.

Also preferably, Re of the second optically-anisotropic layers 14a and 14b is not larger than Re of the third optically-anisotropic layers 15a and 15b, as the viewing angle characteristics of the device may be more improved. Preferably, the condition is satisfied in the entire visible light region.

Figure 3:
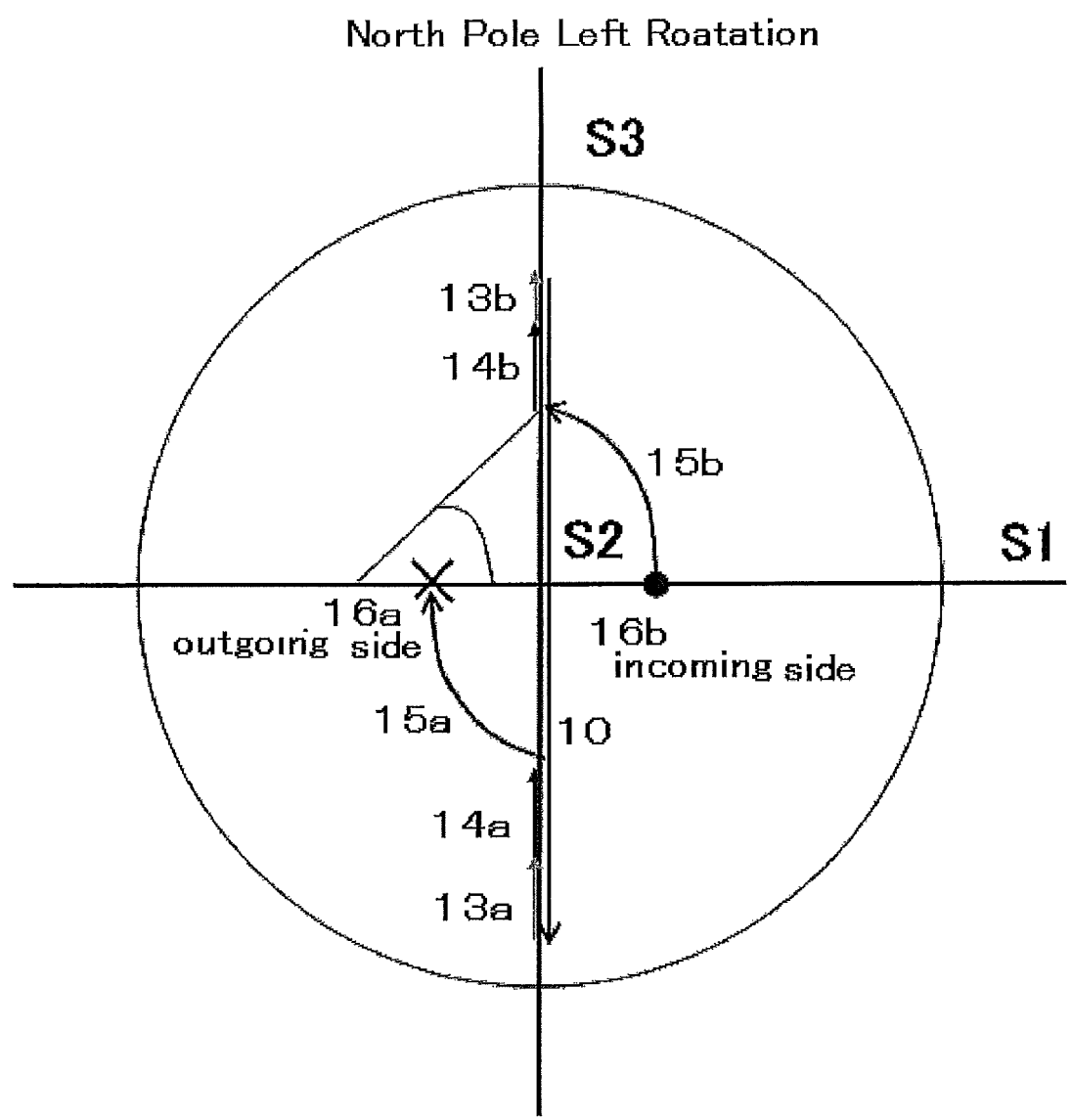
FIG. 3 is a view used for explaining one example of the optical compensatory mechanism of a liquid-crystal display device the invention, on a Poincare sphere.

The polarization state of the light having entered the liquid-crystal display device of FIG. 1 is described with reference to FIG. 3 on the Poincare sphere. FIG. 3 is a view showing the polarization state change of the light having entered the liquid-crystal display device of FIG. 1, through the polarizing element 16b thereof, on a Poincare sphere. The Poincare sphere is a three-dimensional map to describe a polarization state, and the equator of the sphere indicates linear polarization. In this, the light propagation direction in the liquid-crystal display device is at an azimuth direction of 45 degrees and a polar direction of 34 degrees. In FIG. 3, the S2 axis is an axis running through the paper vertically from the back to the top; and FIG. 3 shows a view to see a Poincare sphere from the positive direction of the S2 axis. In this, S1, S2 and S3 coordinates indicate values of stoke's parameters in a certain polarization state. FIG. 3 shows the two-dimensional condition, in which, therefore, the displacement at the point before and after the change of the polarization state is shown by the linear arrow in the drawing. In fact, however, the polarization state change in light having passed through a liquid-crystal layer and an optically-compensatory film is represented by rotation at a specific angle around a specific axis determined in accordance with the individual optical characteristics, on a Poincare sphere. The rotation angle is proportional to the retardation value at the wavelength of the incident light.

In FIG. 3, "●" shows the condition of linear polarization of the incident light in the oblique direction to the polarizing element 16b; and "x" shows the polarization state of the light blocked by the polarizing element 16a. The liquid-crystal display device shown in FIG. 1 satisfies the above conditions (1) to (6), therefore enabling the polarization state conversion as in FIG. 3, and the linear polarization having passed through the polarizing element 16b passes through the third optically anisotropic layer 15b,
the second optically-anisotropic layer 14b,
the first optically-anisotropic layer 13b,
the liquid-crystal layer 10,
the first optically-anisotropic layer 13a,
the second optically-anisotropic layer 14a, and
the third optically-anisotropic layer 15a in this order, and gives linear polarization to be blocked by the polarizing element 16a. As a result, the light leakage in the oblique direction in the black state, and the device can display high-contrast images in a broad viewing angle.

FIG. 3 shows a liquid-crystal display device in which
Δnd of the liquid-crystal layer 10 is 750 nm,
Re(550) of the first optically-anisotropic layer 13a, 13b is 35 nm,
the relation between the alignment axis a, b and the transmission axis of the polarizing element 16a, 16b is 45°,
Re(550) of the second optically-anisotropic layer 14a, 14b is 10 nm and Rth(550) thereof is 80 nm, and Re(550) of the third optically-anisotropic layer is 80 nm and Rth(550) thereof is 120 nm.

The optical compensatory mechanism shown in FIG. 3 is merely one example, and the optical compensatory mechanism of the liquid-crystal display device of the invention should not be limited to it. Use of a liquid-crystal layer having a large value of Δnd to increase the transmittance of the device and use of the three types of the optically-anisotropic layers satisfying the above conditions (2) to (6) for optical compensation are both within the scope of the invention. Even though the optical characteristics of the first, second and third optically-anisotropic layers are shifted from the condition of FIG. 3, the same or similar optical compensation is possible so far as the above conditions (1) to (6) are satisfied. FIG. 4 shows some optical compensation mechanisms employed in the embodiments comprising the second optically-anisotropic layer having Rth different each other. Each of FIG. 4A to FIG. 4D shows a polarization trace on the Poincare sphere of the embodiment of the invention, or that is, a liquid-crystal display device comprising the first optically-anisotropic layer, the second optically-anisotropic layer, the third optically-anisotropic layer and the polarizing element as disposed in this order; and in these FIG. 4A to FIG. 4D, Rth of the second optically-anisotropic layer differs from each other.

Figure 5:
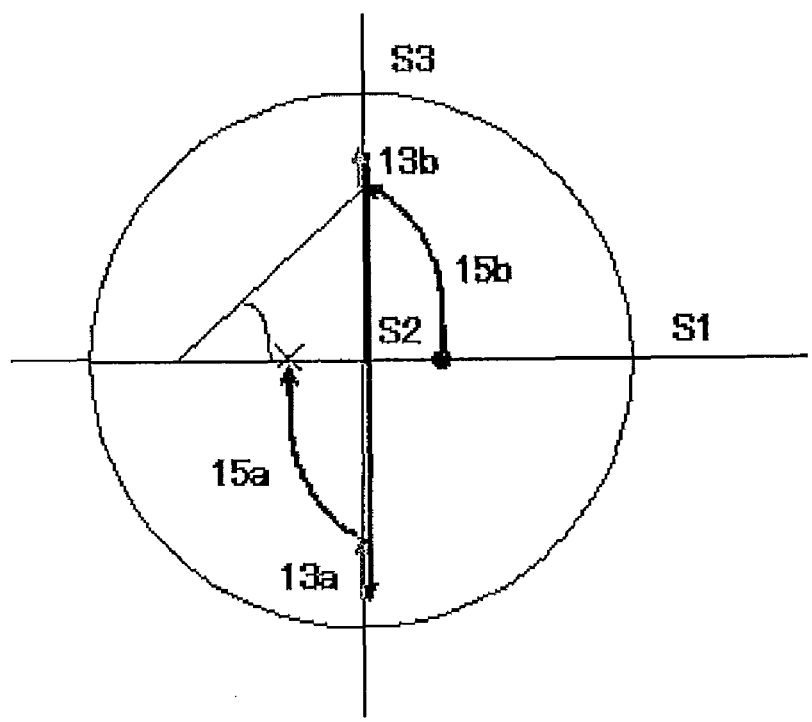
FIG. 5 is a view used for explaining one example of the optical compensatory mechanism of a conventional liquid-crystal display device, on a Poincare sphere.

FIG. 5 shows a polarization trace on the Poincare sphere of a conventional liquid-crystal display device without the second optically-anisotropic layer.

The mechanisms shown in FIG. 4 have a significant advantage in that, since the rotation angles by the optically-anisotropic layers are great, the polarization trace hardly changes owing to the retardation fluctuation of the optically-anisotropic layers, and therefore the display characteristics changes little owing to the fluctuation of the optical characteristics such as Rth and Re of the first, second and third optically-anisotropic layers.

FIGS. 1, 3 and 4 show embodiments of an OCB-mode liquid-crystal display device, but the invention should not be limited to OCB-mode alone, but can exhibit the same advantages also in other embodiments of bend alignment-mode and vertical alignment-mode liquid-crystal display devices.

The first, second and third optically-anisotropic layers for use in the liquid-crystal display device of the invention are described in detail hereinunder.

(First Optically-Anisotropic Layer)

Preferably, the first optically-anisotropic layer is formed of a liquid-crystal composition.

The first optically-anisotropic layer may be formed directly on the surface of the second optically-anisotropic layer mentioned below; however, an alignment film may be formed on the second optically-anisotropic layer and the first optically-anisotropic layer may be formed on it. A liquid-crystal compound layer formed on another substrate may be transferred onto the second optically-anisotropic layer with an adhesive, thereby producing an optical film to be used in the invention.

Examples of the liquid-crystal compound for use in forming the first optically-anisotropic layer include rod-like liquid-crystal compounds and discotic liquid-crystal compounds. The rod-like liquid-crystal compound and the discotic liquid-crystal compound may be selected from polymer liquid crystals or low-molecular liquid crystals, and further may be those formed by crosslinking low-molecular liquid crystals and no more exhibiting liquid-crystallinity.

The first optically-anisotropic layer has an in-plane retardation at a wavelength of 550 nm, Re(500) of from 20 to 50 nm. More preferably, its Re(550) is from 25 to 45 nm.

Preferably, the in-plane retardation, Re[+40°], of the first optically-anisotropic layer, as measured in the first direction inclined at 40° toward the plane of the first optically-anisotropic layer relative to the normal line of the layer in a plane, and the in-plane retardation, Re[−40°], of the layer, as measured in the second direction inclined at 40° oppositely toward the plane of the first optically-anisotropic layer relative to the normal line, satisfy the following formula (II) or (II'):

when Re[+40°]>Re[−40°], $$3 \leq Re[+40°]/Re[-40°] \leq 20 \quad (II)$$

when Re(40°)<Re(−40°), $$3 \leq Re[-40°]/Re[+40°] \leq 20 \quad (II');$$

The two, first and second, directions for measuring Re[+40°] and Re[−40°] are decided in the manner shown in FIG. 2, as described above. A plane "P1" is decided so that it includes the normal line 102 of the first optically anisotropic layer 13a or 13b and an in-plane direction 101 at 90° relative to the in-plane direction 100, which is the direction of the in-plane slow axis of the first optically-anisotropic layer 13a or 13b, provided that the refractive index of the first optically anisotropic layer 13a or 13b in the direction 101 is smaller than that in the first direction 100. The value of Re[+40°] is measured in the direction 103 inclined at +40° toward the plane of the first optically-anisotropic layer 13a or 13b relative to the normal line 102 in the plane P1; and the value of Re[−40°] is measured in the second direction 104 inclined at −40° toward the plane of the first optically-anisotropic layer 13a or 13b relative to the normal line 102 in the plane P1.

The optical characteristics satisfying the above formula (II) or (II') can be achieved by hybrid alignment in which the tilt angles of the molecular symmetric axes of the liquid-crystal molecules relative to the layer face vary in the thickness direction of the layer.

Rod-Like Liquid Crystal Compound

Examples of the rod-like liquid crystal compound, which can be used for preparing the first optically anisotropic layer, include azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans and alkenyl cyclohexyl benzonitriles.

Examples of the rod-like liquid crystal compound also include metal complex compounds. Examples of the rod-like liquid crystal compound also include liquid crystal polymers of which repeating unit comprises a residue of any liquid crystal compound, or in other words, the rod-like liquid crystal compound may bind to any (liquid crystal) polymer chain. Various rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142th committee of Japan Society for the Promotion of Science. The rod-like crystal compounds desirably have a birefringence index of 0.001 to 0.7.

For fixing the alignment state, preferably, the rod-like liquid crystal compound may have a polymerizable group. Preferred are unsaturated polymerizable groups and epoxy group, more preferred are unsaturated polymerizable groups, and even more preferred are ethylene unsaturated polymerizable groups.

Discotic Liquid Crystal Compound

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic liquid crystal compounds also include compounds having a discotic core and substituents, radiating from the core, such as a linear alkyl or alkoxy group or substituted benzoyloxy groups. Such compounds exhibit liquid crystallinity. Preferred are the compounds of which molecule or molecular assembly has a rotational symmetry and an orientational property.

The first optically anisotropic layer may be prepared by using a discotic liquid crystal compound, and after that, the discotic compound in the completed layer is not required to show liquid crystallinity.

In one example, polymerization or cross-linking reaction of a discotic liquid crystal compound, having a low-molecular weight, of which molecule has a group capable of reacting under heat or light, may be carried out to form the first optically anisotropic layer, and the compound in the cured layer may have no liquid-crystallinity.

Preferable examples of the discotic liquid crystal compound include those described in JPA No. hei 8-50206. The polymerization of discotic liquid-crystal compounds is described in JPA No. Hei 8-27284 (1996-27284).

In order to immobilize discotic liquid crystalline molecules by a polymerization, a polymerizable group has to be bonded as a substituent group to a disk-shaped core of the discotic liquid crystalline molecule. In a preferred compound, the disk-shaped core and the polymerizable group are preferably bonded through a linking group, whereby the aligned state can be maintained in the polymerization reaction.

Preferred examples of the discotic liquid crystalline compound having a polymerizable group include the group represented by a formula (I) below.

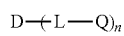
(I)

In the formula, D is a disk-shaped core, L is a divalent liking group, Q is a polymerizable group and n is an integer from 4 to 12.

Examples of the disk-shaped core D include, but are not limited to, those shown below. In each of the examples, LQ or QL means the combination of the divalent linking group (L) and the polymerizable group (Q).

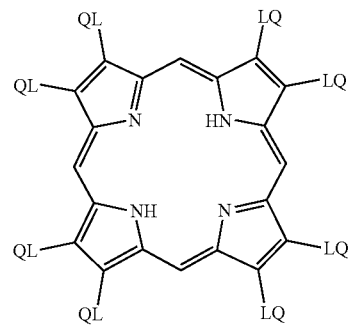
(D1)

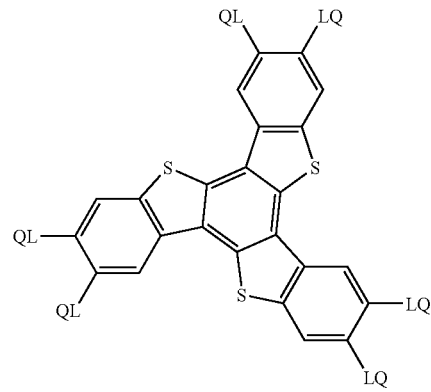
(D2)

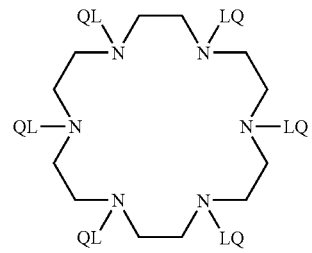
(D3)

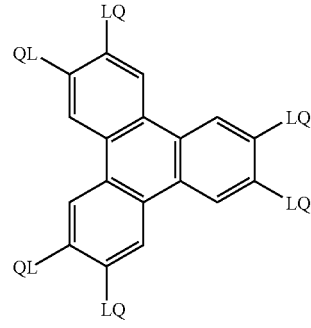
(D4)

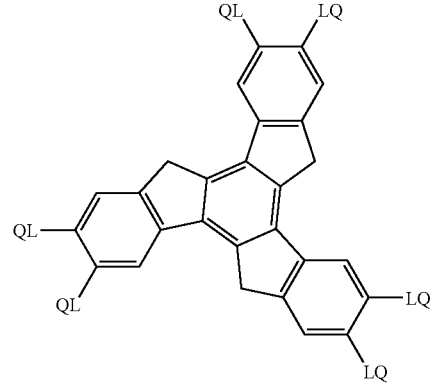
(D5)

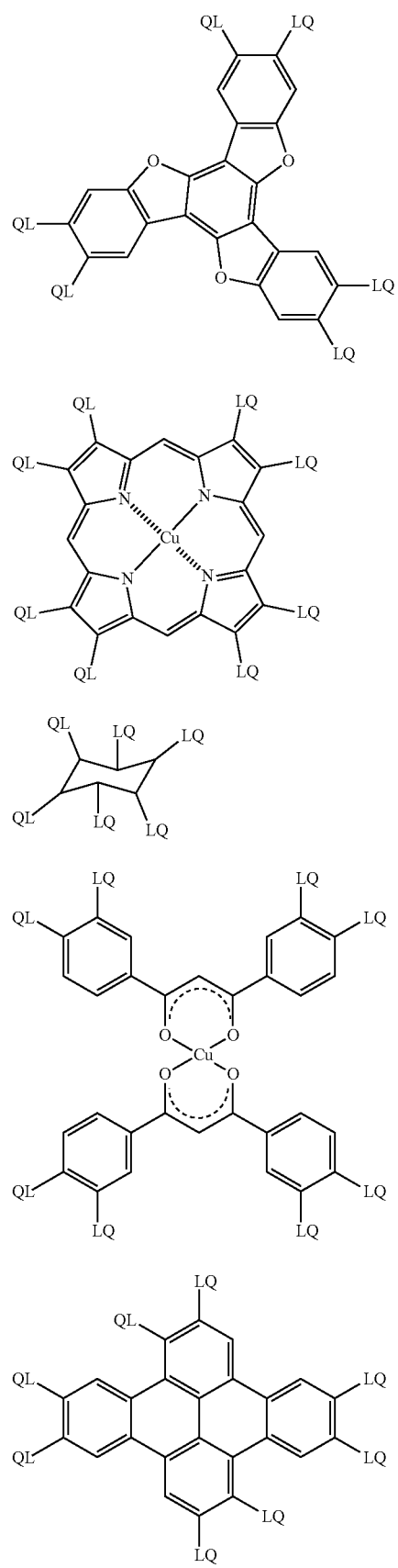
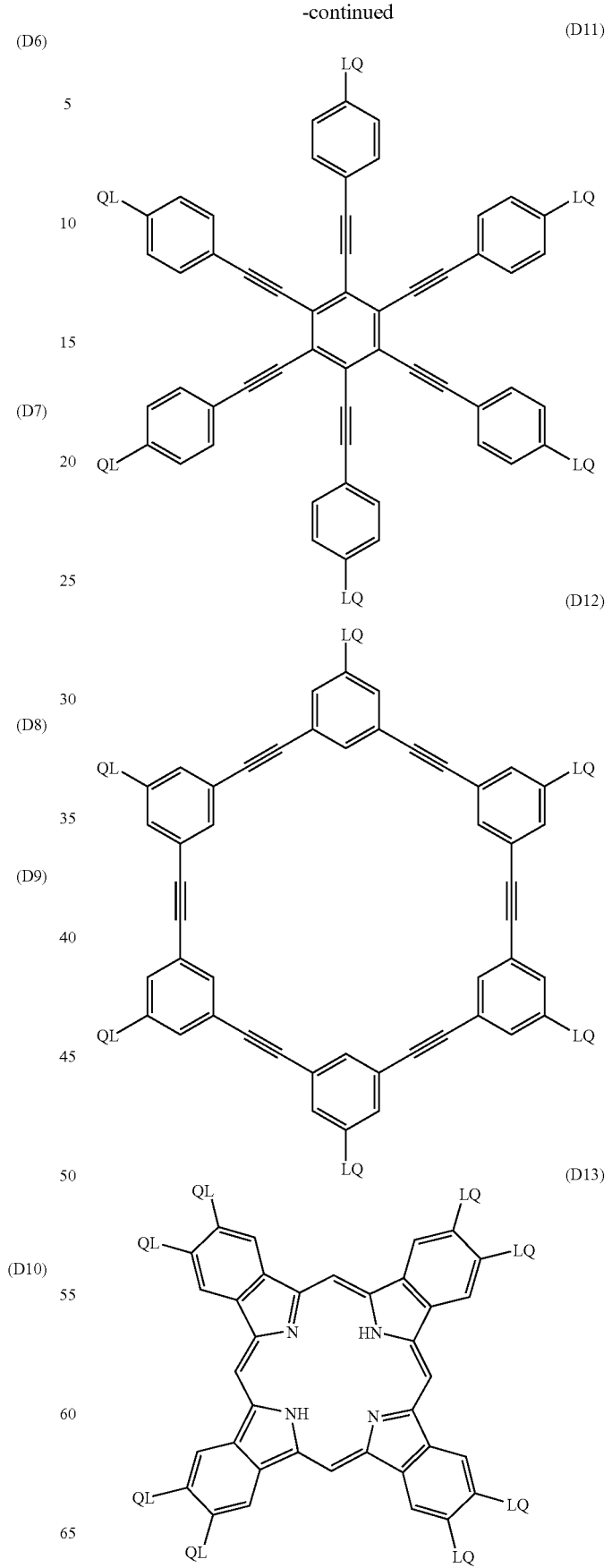

-continued

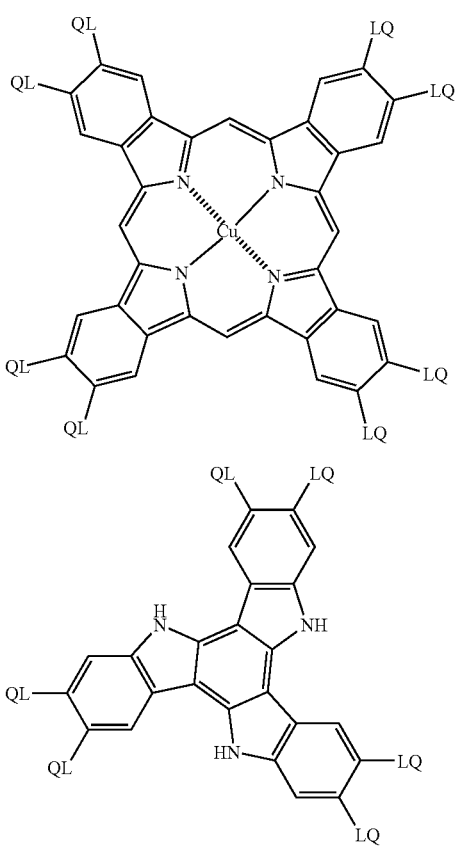

(D14)

(D15)

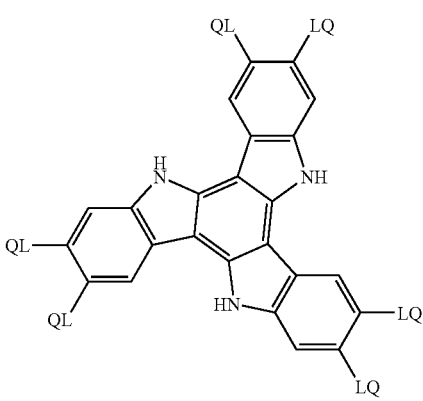

In the formula (I), preferably, L represents a divalent linking group selected from the group consisting of an alkylene, an alkenylene, an arylene, —CO—, —NH—, —O—, —S— and any combinations thereof.

More preferably, L represents a divalent linking group selected from the group consisting of an alkylene, an arylene, —CO—, —NH—, —O—, —S— and any combinations thereof.

Even more preferably, L represents a divalent linking group selected from the group consisting of an alkylene, an arylene, —CO—, —O— and any combinations thereof.

The carbon number of the alkylene group is preferably from 1 to 12; the carbon number of the alkenylene group is preferably from 2 to 12; and the carbon number of the arylene group is preferably from 6 to 10.

Examples of the divalent linking group (L) include, but are not limited to, those shown below as L1 to L24. The left site is the site binding to the discotic core (D), and the right site is the site binding to the polymerizable group (Q). In the examples, "AR" represents an alkylene or alkenylene group; and "AR" represents an arylene group. Each alkylene or arylene may have at least one substituent such as an alkyl.

L1: -AL-CO—O-AL-
L2: -AL-CO—O-AL-
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

In the formula (I), the polymerizable group (Q) may be selected depending on the type of polymerization reaction. The polymerizable group (Q) is preferable an unsaturated polymerizable group or epoxy group, more preferably an unsaturated polymerizable group, and even more preferably an ethylene unsaturated polymerizable group.

In the formula (I), n is an integer form 4 to 12, and may be decided depending on the type of the discotic core (D). The plurality of the combination of L and Q may be same or different, and preferably same.

Preferable examples of the liquid crystal compound to be used in preparation of the first optically anisotropic layer also include the compound represented by formula (DI) shown below. The compounds of formula (DI) have high birefringence and are preferable. Among the compounds of formula (DI), the compounds showing discotic liquid crystallinity are more preferable, and the compounds showing a discotic nematic phase are even more preferable.

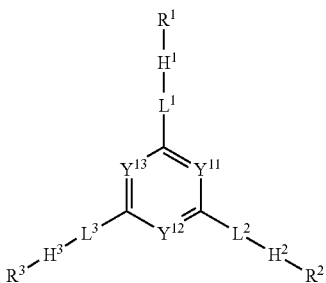

(DI)

Preferable examples of the discotic liquid crystal compound to be used in preparation of the first optically anisotropic layer also include those described in JPA No. 2006-76992, the column of [0052], and JPA No. 2007-2220, the columns of [0040] to [0063].

Preferable examples of the discotic liquid crystal compound to be used in preparation of the first optically anisotropic layer also include those described in JPA No. 2005-301206.

Alignment of Liquid Crystal Molecules

According to the invention, the first optically anisotropic layer is disposed so that the alignment axis thereof is in the direction at 40° to 50° relative to the transmission axis. An alignment layer of which surface is subjected to a rubbing treatment along a rubbing axis may be used for preparing the first optically anisotropic layer. And, according to such an embodiment, the alignment axis may be the rubbing axis of the alignment layer. The alignment direction of liquid crystal molecules in the first optically anisotropic layer is predetermined by the alignment axis, and the molecules in the layer are fixed in the alignment state.

In the first optically anisotropic layer, preferably, the liquid crystal molecules are fixed in a hybrid alignment state. According to the hybrid alignment, the angle between the molecular symmetric axis and the layer plane is varied along the thickness direction. For example, the angle is increased or decreased along with the increase of the distance from the second optically anisotropic layer.

Preferably, the angle is increased along with the increase of the distance from the second optically anisotropic layer. Also the variation of the angle may be a continuous increase, a continuous decrease, an intermittent increase, an intermittent decrease, a change including a continuous increase and a continuous decrease, or an intermittent change including an increase and a decrease. The intermittent change may contain a region in which the angle does not change, within the thickness direction.

Also the angular variation may be a general increase or a general decrease over the thickness, even including a region without angular change. Also, a continuous angular variation is preferable.

The mean direction of the molecular symmetry axes of liquid crystal molecules may be generally adjusted by selecting the type of the liquid crystal compounds to be used in producing optically anisotropic layers and the materials to be used in producing alignment layers, or by selecting the condition of the rubbing treatments to be applied to alignment layers.

According to the invention, it is preferable that the mean alignment direction of the molecular symmetric axes in the first optically anisotropic layer is not perpendicular or parallel to the slow axis of the second optically anisotropic layer.

The directions of the molecular symmetric axes of liquid crystal molecules existing in the surface side (air-interface side) of the layer may be adjusted by selecting the type of the liquid crystal compounds or the type of the additives to be used in producing optically anisotropic layers.

Examples of the additive to be used with the liquid crystal compound include plasticizers, surfactants, polymers and polymerizable monomers. The variation degree in the alignment directions of molecular symmetric axes may be adjusted by selecting the type of the liquid crystal compounds or the type of the additives to be used in producing optically anisotropic layers. Especially, regarding the surfactants, a good balance with controlling surface tension may be required.

Such additive preferably has a compatibility with the liquid crystalline molecules and has a property of changing the tilt angle thereof or of not inhibiting the alignment thereof. Among the additives, polymerizable monomers such as compounds having a vinyl group, vinyloxy group, acryloyl group and methacryloyl group are preferably added to the composition. Such polymerizable compound may be added to the composition with an amount of 1 to 50%, and preferably added with an amount of 5 to 30% with respect to the weight of liquid crystalline compound. Using polymerizable monomer having four or more reactive functional group per a molecule may contribute to improving the adhesion between the alignment layer and the optically anisotropic layer.

The optically anisotropic layer may comprise one or more types of polymers with the liquid crystalline compound. The polymer preferably has a compatibility with the liquid crystalline molecules and has a property of changing the tilt angle thereof. Examples of such polymer include cellulose esters. Preferred examples of the cellulose ester include cellulose acetate, cellulose acetate propionate, hydroxy propyl cellulose and cellulose acetate butyrate.

The polymer may be added in an amount so as to avoid disorder of alignment of liquid crystalline molecules, is preferably added with an amount of 0.1 to 10%, more preferably 0.1 to 8%, an even more preferably 0.1 to 5% with respect to the weight of the liquid crystalline compound.

It is preferred that the discotic liquid crystalline molecules has a transition temperature between the discotic liquid crystalline phase and the solid phase within a range of 70 to 300° C., more preferably 70 to 170° C.

According to the invention, the thickness of the first optically anisotropic layer is preferably from 0.1 to 20 μm, more preferably from 0.5 to 15 μm, and even more preferably from 1 to 10 μm.

Alignment Layer

For preparing the first optically anisotropic layer, an alignment layer is preferably employed. For example, an alignment layer may be formed on a polymer film to be used as the second optically anisotropic layer, and a liquid crystal composition may be applied to the surface of the alignment layer to form the first optically anisotropic layer.

The alignment layer is preferably the layer of crosslinked polymer. The polymer which can be used for preparing the alignment layer may be selected from self-crosslinkable polymers or selected from polymers capable of being crosslinked by a crosslinking agent.

The alignment layer may be formed by carrying out reaction of functional group-containing polymers under light, heat or variation of the pH. Or the alignment layer may be formed by carrying out crosslinking reaction of polymer with a crosslinking agent having a high activity.

The alignment layer formed of a crosslinked polymer may be prepared by applying a coating fluid containing such a polymer or such a mixture of polymer and crosslinking agent to a surface of a polymer to be used as the second optically anisotropic layer, and then by applying heat thereto.

In the rubbing step, described hereinafter, in order to prevent the alignment layer from dusting, the higher crosslinking degree is preferable. The crosslinking degree may be defined as "1−(Ma/Mb)" where "Mb" is an amount of the crosslinking agent to be added to the coating fluid and "Ma" is an amount of the residual crosslinking agent after crosslinking reaction; and the crosslinking degree defined in such a manner is preferably from 50 to 100%, more preferably from 65 to 100% and even more preferably from 75 to 100%.

The polymer which can be used for preparing the alignment layer may be selected from self-crosslinkable polymers or selected from polymers capable of being crosslinked by a crosslinking agent. Or it may be selected from polymers having both functions.

Examples of the polymer include polymethyl methacrylates, acrylic acid/methacrylic acid copolymers, styrene/maleimide copolymers, polyvinyl alcohols, modified polyvinyl alcohols, poly(N-methyrol acrylamide), styrene/vinyl toluene copolymers, chlorosulfonized polyethylenes, nitrocelluloses, polyvinylchlorides, chlorinated polyolefins, polyesters, polyimides, vinyl acetate/vinyl chloride copolymers, carboxymethyl celluloses, polyethylenes, polypropylenes, polycarbonates, and silane coupling agents.

Preferable examples include hydrophilic polymers such aspoly(N-methyrol acrylamide), calboxymethyl celluloses, gelatins, polyvinyl alcohols and modified polyvinyl alcohols. More preferred are gelatins, polyvinyl alcohols, and modified polyvinyl alcohols; and even more preferred are polyvinyl alcohols and modified polyvinyl alcohols.

Among those, polyvinyl alcohols and modified polyvinyl alcohols are preferred. Examples of the usable polyvinyl alcohol include polyvinyl alcohols having a saponification degree of 70 to 100%, polyvinyl alcohols having a saponification degree of 80 to 100% and polyvinyl alcohols having a saponification degree of 85 to 95%.

Examples of the modified polyvinyl alcohol include polyvinyl alcohols modified through copolymerization which may have a COONa, $Si(OX)_3$, $N(CH_3)_3 \cdot Cl$, $C_9H_{19}COO$, $SO_3Na$ or $C_{12}H_{25}$ as an induced modification group; polyvinyl alcohols modified through chain transferring which may have COONa, SH or $C_{12}H_{25}$ as an induced modification group; and polyvinyl alcohols modified through block-copolymerization which may have COON, $CONH_2$, COOR or $C_6H_5$ as an induced modification group.

The polymerization degree of the usable non-modified or modified polyvinyl alcohol may be from 100 to 3,000. Examples of the preferable polyvinyl alcohol include non-modified or modified polyvinyl alcohols having a saponification degree of 80 to 100%, non-modified or alkylthio-modified polyvinyl alcohols having a saponification degree of 85 to 95% and polyvinyl alcohols having a saponification degree of 85 to 95%.

Examples of the modified polyvinyl alcohol include the products of the compound represented by the formula (2) and a polyvinyl alcohol. In the formula (2), $R^1$ represents a non-substituted alkyl group or a substituted alkyl group having at least one acryloyl group, methacryloyl group or epoxy group; w represents a halogen atom, an alkyl group or an alkoxy group; x represents an atomic group capable of forming an active ester, an acid anhydride or an acid halide; l is 0 or 1; and n is an integer from 0 to 4.

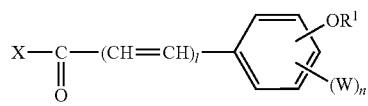

(2):

Examples of the modified polyvinyl alcohol also include the products of the compound represented by the formula (2) and a polyvinyl alcohol. In the formula, $X^1$ represents an atomic group capable of forming an active ester, an acid anhydride or an acid halide; and m is an integer from 2 to 24.

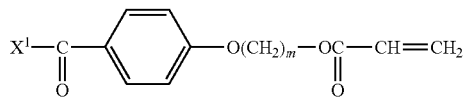

(3):

Examples of the polyvinyl alcohol which can be used for reacting with the compound represented by the formula (2) or (3) include non-modified polyvinyl alcohols and modified polyvinyl alcohols such as copolymerization-modified, chain-transferring modified and bloc-copolymerization modified polyvinyl alcohols.

Examples of the modified polyvinyl alcohols include those described in JPA No. hei 8-338913.

The hydrophilic polyvinyl alcohol may be used for preparing the alignment layer, and in terms of hardening degree, the percentage of water content in the hydrophilic polyvinyl alcohol may be controlled. The percentage is preferably from 0.4 to 2.5%, and more preferably from 0.6 to 1.6%. The percentage is measurable with any commercially available moisture percentage meter employing a Karl Fischer's method.

The thickness of the alignment layer is preferably equal to or less than 10 μm.

In other embodiments, the first optically anisotropic layer may be a layer containing at least one polymer, having no liquid crystallinity, selected from the group consisting of polyamides, polyimides, polyesters, polyether ketones, polyamideimides and polyesterimides. A direction along which anisotropy in refractive index is expressed is a direction along which retardation is expressed. Regarding a benzene ring, a direction vertical to the pi orbital is the direction along which anisotropy in refractive index is expressed, and is the direction along which retardation is expressed. Retardation is expressed due to the localization of the electro cloud such as pi cloud. Therefore, the layer in which the benzene rings are aligned with any tilt angle may satisfy the conditions (2) to (4) which the first optically anisotropic layer is required to have. More specifically, the first optically anisotropic layer, satisfying the above mentioned conditions (2) to (4), may be prepared as follows: a polymer film is prepared by using the above mentioned non-liquid crystallinity polymer, stretched biaxially, cut along any oblique direction and then stretched biaxially.

(Second Optically-Anisotropic Layer and Third Optically-Anisotropic Layer)

In the invention, the second optically-anisotropic layer is such that its in-plane retardation (Re) at a wavelength of 550 nm, Re(550) satisfies 0<|Re(550)|≦40 nm, and its thickness-direction retardation (Rth) at a wavelength of 550 nm, Rth(550) satisfies 0 nm<Rth(550)<Δnd/2. In the relation, Δnd is Δnd of the liquid-crystal layer. Preferably, Re(550) of the second optically-anisotropic layer is from 0 to 40 nm, more preferably from 0 to 20 nm. The preferred range of Rth(550) of the second optically-anisotropic layer varies depending on the value of Δnd of the liquid-crystal layer; but in general, Rth(550) of the second optically-anisotropic layer is preferably from 30 to 500 nm, more preferably from 60 to 300 nm.

In the invention, the third optically-anisotropic layer is the layer of which in-plane retardation (Re) at a wavelength of 550 nm, Re(550) satisfies 0<|Re(550)|≦300 nm, and thickness-direction retardation (Rth) at a wavelength of 550 nm, Rth(550) satisfies −100 nm<Rth(550)<Δnd/2. In the relation, Δnd is Δnd of the liquid-crystal layer. Preferably, Re(550) of the third optically-anisotropic layer is from 30 to 300 nm, more preferably from 40 to 150 nm. The preferred range of Rth(550) of the third optically-anisotropic layer varies depending on the value of Δnd of the liquid-crystal layer; but in general, Rth(550) of the third optically-anisotropic layer is preferably from 30 to 500 nm, more preferably from 30 to 300 nm.

The total of Rth(550) of the second and third optically-anisotropic layers disposed on one side of the liquid-crystal cell is preferably at most (Δnd of the liquid-crystal layer)/2. The preferred range of the total of Rth(550) of the second and third optically-anisotropic layers varies depending on the value of Δnd of the liquid-crystal layer; but in general, the total Rth(550) is preferably from 250 to 650 nm, more preferably from 300 to 500 nm.

A liquid crystal display device without the third optically-anisotropic layer cannot achieve the effect of the invention even though the device comprises a polymer film or the like which has a high Rth(550), falling within the preferred range of the total Rth(550) of the above-mentioned second and third optically-anisotropic layers, as the second optically-anisotropic layer. In addition, in order to prepare a polymer film having such a high Rth, a large amount of additives such as a retardation enhancer must be added to it, but this may worsen the production aptitude in that the haze of the polymer film may increase and the additives may bleed out.

When Re of the second optically-anisotropic layer disposed on one side of the liquid-crystal cell is not higher than Re of the third optically-anisotropic layer, then it is preferable as improving viewing angle characteristics. Preferably, this condition is satisfied within the whole visible light range.

Preferably, the second and third optically anisotropic layers are transparent polymer films, and, more specifically, transparent polymer films having a transparency equal to or more than 80%.

Examples of the polymer film to be used as the second or third optically anisotropic layer include films of cellulose esters such as cellulose acetate and cellulose diacetate; norbornene base polymer films; and polymethyl methacrylate films. Commercially available films are also usable. Examples of the commercially available norbornene base film include ARTON series (by JSR) and ZEONEX series (by Nippon Zeon). Among these, films made of cellulose esters are preferable, and films made of cellulose low-fatty acid esters are more preferable. In the description, the term "low-fatty acid" is used for any $C_6$ or shorter fatty acids. Especially, cellulose acetate (C2), cellulose propionate (C3) and cellulose butyrate (C4) are preferable. The films made of cellulose acetate are especially preferable. Mixed fatty acid esters such as cellulose acetate propionate and cellulose acetate butyrate are also usable.

Other known polymers such as polycarbonates and polysulfones easily exhibit birefringence, however, their exhibition of birefringence is controllable by modifying molecules as described in WO 00/26705 pamphlet. And such polymers may be used as a material for preparing films to be used as the second or third optically anisotropic layer.

The optical film is used as a protective film of a polarizing element or a retardation film, then it is desirable that a film of cellulose acetate having a degree of acetylation of from 55.0 to 62.5% around is used as the polymer film. More preferably, the degree of acetylation is from 57.0 to 62.0% around. The degree of acetylation as referred to herein means the amount of bonding acetic acid per mass of the cellulose unit.

The degree of acetylation may be determined through measurement and calculation of the degree of acetylation according to ASTM D-817-91 (test method for cellulose acetate and others).

The viscosity-averaged degree of polymerization of cellulose acetate is preferably equal to or more than 250 around, and more preferably equal to or more than 290 around. The molecular weight distribution, Mw/Mn, where Mw is a weight-averaged molecular weight and Mn is a number-averaged molecular weight, measured according to a gel permeation chromatography, of cellulose acetate is preferably narrow.

Specifically, the value of Mw/Mn is preferably from 1.0 to 4.0 around, more preferably from 1.0 to 1.65 around and even more preferably from 1.0 to 1.6 around.

In cellulose acetate, the 2-, 3- and 6-hydroxyl groups of cellulose could not be uniformly substituted, but the degree of substitution at the 6-position may be low.

For the polymer film for use as the second optically-anisotropic layer and the third optically-anisotropic layer, it is desirable that the degree of 6-substitution of cellulose is the same as or higher than that of 2- or 3-substitution.

Preferably, the proportion of the degree of 6-substitution to the total degree of 2-, 3- and 6-substitution is from 30 to 40%, more preferably from 31 to 40%, even more preferably from 32 to 40%. Also preferably, the degree of 6-substitution is at least 0.88. The degree of substitution at each position may be determined through NMR.

Cellulose acetate having a high degree of 6-substitution may be produced with reference to Production Example 1 described in JPA No. hei 11-5851, paragraphs [0043] to [0044], Production Example 2 in paragraphs [0048] to [0049] and Production Example 3 in paragraphs [0051] to [0052].

The birefringence coefficient, $\Delta n = nx - ny$, of the cellulose acetate film to be used as the second or third optically anisotropic layer is preferably from 0.00025 to 0.00088 around. The birefringence coefficient in the thickness-direction, $\{(nx+ny)/2-nz\}nx-ny$, of the cellulose acetate film to be used as the second or third optically anisotropic layer is preferably from 0.00088 to 0.005 around.

Preferably, the absolute value of the photoelasticity coefficient of the second optically-anisotropic layer and the third optically-anisotropic layer is at most $10 \times 10^{-12}$ m$^2$/N both in the machine direction and in the direction perpendicular to the machine direction.

The cellulose acetate film to be used as the second or third optically anisotropic layer may comprise at least one retardation enhancer. And preferable examples of the enhancer and the method for preparing them are described in JPA Nos. 2000-154261 and 2000-111914.

Also preferably, cyclic olefin copolymer (COC) films, cyclic olefin polymer (COP) films and cellulose acetate propionate (CAP) films are used for the second and third optically-anisotropic layers. In particular, COC films and COP films have low moisture permeability, and are therefore favorable as hardly influenced by the external environmental humidity. In particular, COC films or COP films are preferred for the third optically-anisotropic layer nearer to polarizing element. These films are commercially available and, it is preferable to use their commercial products directly or, if desired, after processed for stretching or the like, as the second and third optically-anisotropic layers.

(Optical Film)

The first and second optically-anisotropic layers may be produced as one continuous optical film. A production method for the optical film is described below.

<<Production Method for Rolled Optical Film>>

The optical film may be produced according to a continuous process of the following steps (1) to (4):

Step (1): While a long continuous polymer film to be used at least for a second optically-anisotropic layer is conveyed in the lengthwise direction, the surface of the film or the surface of the alignment film formed on the film surface is rubbed with a rubbing roll.

Step (2): A coating liquid containing a liquid-crystal compound is applied onto the rubbed surface.

Step (3): The coating liquid applied to the surface is dried, and at the same time or after the drying, molecules of the liquid-crystal compound are aligned at a temperature not lower than the liquid-crystal transition temperature, and the alignment is fixed to form a first optically-anisotropic layer.

Step (4): The long and continuous optical film having the first optically-anisotropic layer formed on the polymer film of the optically-anisotropic layer is wound up.

In the process, it is desirable that the velocity of the air blow given to the surface of the liquid-crystal compound in the direction different from the rubbing direction, during the step (3) of aligning the liquid-crystal compound at a temperature not lower than the liquid-crystal transition temperature, satisfies the following formula (3), and in the formula (3), more preferably, V is from 0 to $2.5 \times 10^{-3} \times \eta$. In the following formula (3), V is the velocity (m/sec) of the air blow given to the surface of the liquid-crystal compound, and η is the viscosity (cp) of the liquid-crystal compound layer at the alignment temperature of the liquid-crystal compound.

$$0<V<5.0\times10^{-3}\times\eta \quad (3)$$

According to the production method for optical film in the invention, it is possible to continuously and stably produce an optical film capable of satisfying the condition that the mean direction of the molecular symmetric axes of molecules of the liquid-crystal compound, or that is, the mean direction of the molecular symmetric axes of the first optically-anisotropic layer differs from the in-plane slow axis of the second optically-anisotropic, or that is, the lengthwise direction of the second optically-anisotropic, and further, the angle between the mean direction of the molecular symmetric axes and the rubbing direction is substantially 0°, preferably from −2 to 2°, more preferably from −1 to 1°; and the method is suitable to mass-production.

When the optical film of the invention is applied to an OCB-mode liquid-crystal display device, it is desirable that the optical film is stuck to a polarizing element having, as laminated thereon, a protective film of a polymer film for the third optically-anisotropic layer, in a mode of roll-to-roll operation. As the film for use in the step (1), usable is a laminate of a polymer films to be used as the second and third optically-anisotropic layers, and in the steps (2) to (4), a long and continuous optical film may be produced, comprising the first, second and third optically-anisotropic layers. The long and continuous optical film, or that is, the laminate of the first, second and third optically-anisotropic layers is stuck to a long and continuous polarizing element film in a mode of roll-to-roll operation. In embodiments employing any of those production methods in the invention, the films are so stuck together that the angle between the alignment axis (for example, the rubbing axis) of the first optically-anisotropic layer and the transmission axis of the polarizing element is at from 40 to 50°, preferably at about 45°.

Further, it is desirable that the production method for optical film mentioned in the above includes any of the following requirements (a) to (d). The details of these steps are described in JPA No. hei 9-73081.

(a) In the above step (2), a crosslinkable functional group-having polymerizing liquid-crystal compound is used, and in the above step (3), the coating layer is continuously irradiated with light to thereby polymerize the polymerizing liquid-crystal compound and cure it in an aligned state, and thereafter the step is continuously followed by the step (4).

(b) In the above step (1), the surface of the second optically-anisotropic layer or the alignment film is rubbed with a rubbing roll, while cleaned for dust removal.

(c) Prior to the step (2), the rubbed surface of the second optically-anisotropic layer or the alignment film is cleaned for dust removal.

(d) Prior to the step (4), the film is inspected by continuously measuring the optical characteristics of the formed first optically-anisotropic layer.

The steps (1) to (4) are described in more detail hereinunder.

[Step (1)]

In the step (1), the surface of the second optically-anisotropic layer of a long and continuous optically-anisotropic layer laminate that is conveyed in the lengthwise direction, or the surface of the alignment film formed on that second optically-anisotropic is rubbed with a rubbing roll.

The diameter of the rubbing roll to be used in the step (1) is preferably from 100 to 500 mm, from the viewpoint of the handling aptitude and the cloth life, more preferably from 200 to 400 mm.

The width of the rubbing roll must be broader than the width of the film to be conveyed, and is preferably at least the film width$\times 2^{1/2}$.

The revolution speed of the rubbing roll is preferably set low from the viewpoint of preventing dusting; and depending on the alignment of the liquid-crystal compound, it is preferably from 100 to 1,000 rpm, more preferably from 250 to 850 rpm.

In order to keep the alignment of the liquid-crystal compound even though the revolution speed of the rubbing roll is set low, it is desirable to heat the second optically-anisotropic layer or the alignment film during rubbing. The heating temperature is preferably from (Tg of the film material −50° C.) to (Tg of the film material +50° C.), in terms of the film surface temperature of the second optically-anisotropic layer or the alignment film. In case where an alignment film of polyvinyl alcohol is used, it is desirable to control the ambient humidity in rubbing. Preferably, the relative humidity at 25° C. is from 25 to 70% RH, more preferably from 30 to 60% RH, even more preferably from 35 to 55% RH.

The conveying speed of the optically-anisotropic layer laminate is preferably from 10 to 100 m/min from the viewpoint of the producibility and from the viewpoint of the alignment of the liquid-crystal compound, more preferably from 15 to 80 m/min. For conveying the film, usable are various devices heretofore used for film conveyance, and the conveying method is not specifically defined.

The alignment film may be formed by applying a coating liquid, which is prepared by dissolving a material such as the above-mentioned polyvinyl alcohol in water and/or an organic solvent, onto the surface of the second optically-anisotropic layer and drying it. The alignment film formation may be attained prior to the series of the above-mentioned process, and the alignment film may be continuously formed on the surface of the long and continuous second optically-anisotropic layer being conveyed in the process.

[Step (2)]

In the step (2), a coating liquid containing a liquid-crystal compound is applied onto the rubbed surface. The solvent for use in preparing the coating liquid for forming the first optically-anisotropic layer is preferably an organic solvent. Examples of the organic solvent include amides such as N,N-dimethyl formamide; sulfoxides such as dimethylsulfoxide; heterocyclic compound such as pyridine; hydrocarbons such as benzene and hexane; alkyl halides such as chloroform, dichloromethane and tetrachloroethane; esters such as methyl acetate and butyl acetate; ketones such as acetone and methylethyl ketone; and ethers such as tetrahydrofuran and 1,2-dimethoxyethan. Alkyl halides and ketones are preferable. Two or more types of solvents may be used.

For forming a first optically-anisotropic layer of high uniformity, it is desirable that the surface tension of the coating liquid is at most 25 mN/m, more preferably at most 22 mN/m.

In order to prepare the first optically anisotropic layer having such low surface tension, at least one surfactant or fluorine compound may be added to the coating liquid to be used in preparation of the first optically anisotropic layer. Preferable examples of such an additive include fluorine-containing polymers such as fluoroaliphatic-group containing copolymers comprising a repeating unit derived from the compound (i) shown below and a repeating unit derived from the compound (ii) shown below.

(i) A fluoroaliphatic-containing monomer represented by formula (4) shown below, and
(ii) poly(oxyalkylene) acrylate and/or poly(oxyalkylene) methacrylate:

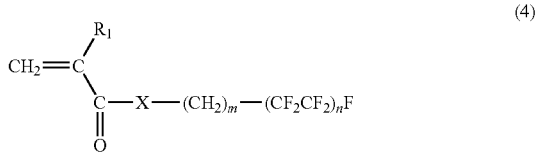

(4)

In formula (4), $R^1$ represents a hydrogen atom or methyl; X represents an oxygen atom, sulfur atom or —$N(R^2)$—; m is an integer from 1 to 6; and n is an integer from 2 to 4. $R^2$ represents a hydrogen atom or $C_{1-4}$ alkyl group.

The weight-averaged molecular weight of the fluorine-containing polymer to be added to the coating liquid, which is be used in preparation of the first optically anisotropic layer, is preferably from 3,000 to 100,000 around and more preferably from 6,000 to 80,000 around.

The amount of the fluorine-containing polymer to be added to the coating composition, comprising liquid crystal as a major ingredient, is preferably from 0.05 to 8 mass %, more preferably from 0.01 to 1 mass % and even more preferably from 0.05 to 0.5 mass % with respect to the total mass of the coating composition without solvent. When the amount of the fluorine-containing polymer is smaller than 0.05 mass %, it may be impossible to obtain the sufficient effect; and when the amount of fluorine-containing polymer is larger than 8 mass %, it may be impossible to dry the coated layer fully or to obtain an excellent optical film without lowering qualities such as uniformity in retardation.

The coating liquid may be applied to the rubbed surface in any known method (for example, wire bar coating method, extrusion coating method, direct gravure coating method, reverse gravure coating method, die coating method). The coating amount may be suitably determined depending onto the desired thickness of the intended first optically-anisotropic layer.

[Step (3)]

In the step (3), during or after drying the coating liquid applied onto the surface, the liquid-crystal compound is aligned at a temperature not lower than the liquid-crystal transition temperature thereof, and the alignment is fixed to form a first optically-anisotropic layer. The liquid-crystal compound may be aligned in a desired manner by heating drying or by heating after drying.

The drying temperature may be determined in consideration of the boiling point of the solvent used in the coating liquid and of the materials of the second optically-anisotropic layer, the third optically-anisotropic layer and the alignment film. The alignment temperature of the liquid-crystal compound may be determined in accordance with the liquid-crystal phase¥solid phase transition temperature of the liquid-crystal compound used.

In case where a discotic liquid-crystal compound is used, the alignment temperature is preferably from 70 to 300° C., more preferably from 70 to 170° C.

The viscosity of the liquid-crystal state is preferably from 10 to 10,000 cp, more preferably from 100 to 1,000 cp.

When the viscosity is too low, then the coating liquid may be much influenced by the air blow in alignment, and for continuous production, air blow speed/air blow direction control of extremely high accuracy may be needed. On the other hand, when the viscosity is high, the coating liquid may be hardly influenced by air blow; but if so, the liquid crystal alignment speed may be slow and the producibility may extremely worsen.

The viscosity of the liquid-crystal layer may be suitably controlled by the molecular structure of the liquid-crystal compound. Preferably used herein is a method of controlling the viscosity to a desired level by using a suitable amount of the above-mentioned additive (especially, cellulose polymer) and a gelling agent.

The heating may be attained by applying hot air at a predetermined temperature to the layer, or by conveying the layer through a hot room kept at a predetermined temperature.

It is desirable that the velocity of the hot air to be given to the liquid-crystal compound layer in the direction different from the rubbing direction is controlled as in the following formula (3). In the following formula (3), V is the velocity (m/sec) of the air blow given to the surface of the liquid-crystal compound, and η is the viscosity (cp) of the liquid-crystal compound layer at the alignment temperature of the liquid-crystal compound.

$$0 < V < 5.0 \times 10^{-3} \times \eta \quad (3)$$

Further, the aligned liquid-crystal compound is fixed, while its alignment state is kept as such, thereby forming a first optically-anisotropic layer. The fixation of the liquid-crystal compound may be attained by cooling it to the solid-phase transition point of the compound, or by polymerization. Preferably, the fixation is attained by polymerization. The polymerization includes thermal polymerization with a thermal polymerization initiator, and a photopolymerization with a photopolymerization initiator. Preferred is photopolymerization.

Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JPA shyo No. 60-105667 and U.S. Pat. No. 4,239,850) and oxadiazole compounds (described in U.S. Pat. No. 4,212,970).

The amount of the photo-polymerization initiator to be used is preferably 0.01 to 20%, more preferably 0.5 to 5% with respect to the mass of solids in the coating liquid.

Irradiation for polymerizing the liquid-crystalline molecules preferably uses UV rays. The irradiation energy is preferably 20 mJ/cm² to 50 J/cm², more preferably 20 to 5000 mJ/cm² and much more preferably 100 to 800 mJ/cm². Irradiation may be carried out under heating to accelerate the photo-polymerization reaction.

For promoting the photopolymerization, the layer may be irradiated with light under heat. The irradiation with light may be attained by leading the second optically-anisotropic layer (and the third optically-anisotropic layer) coated with the coating liquid for first optically-anisotropic layer formation, to pass through a conveyance line having at least one light source disposed in any of the top and the bottom and the right and the left of the path line.

Prior to the step (4), a protective film may be formed on the first optically-anisotropic layer formed in the step (3). For example, a film for protective layer previously prepared may be continuously laminated on the surface of the first optically-anisotropic layer formed as a long and continuous film.

In the step (4), the long and continuous laminate with the first optically-anisotropic layer formed thereon is wound up. The winding may be attained by rolling the second optically-anisotropic layer and the third optically-anisotropic layer that has the first optically-anisotropic layer and is continuously conveyed, around a cylindrical core.

The optical film obtained in the step (4) is in the form of a roll, and its handling is easy even when used in mass-production. This may be stored and transported as it is.

Regarding the details of the conditions in the steps of the production method and the devices usable therein, referred to are the conditions and the devices described in JPA No. hei 9-73081.

(Elliptically Polarizing Plate)

In the invention, an elliptically polarizing plate prepared by laminating first, second and third optically-anisotropic layers on a polarizing element may be used. The elliptically polarizing plate may be produced as follows: A third optically-anisotropic layer is laminated on a polarizing element to prepare a first polarizer; and an optical film laminate of a first optically-anisotropic layer and a second optically-anisotropic layer is prepared. The first polarizer and the optical film laminate are stuck together in such a manner that the third optically-anisotropic layer could face the second optically-anisotropic layer, using an adhesive. Alternatively, elliptically polarizing plate may also be produced as follows: An optical film laminate of first, second and third optically-anisotropic layers is prepared, then it is stuck to a polarizing element with the third optically-anisotropic layer facing the polarizing element, using an adhesive. The elliptically polarizing plate may be produced as a long and continuous plate, and thereafter this may be cut into sheets having a desired shape just before its actual use.

The elliptically polarizing plate has not only a polarizing function but also an excellent optical compensatory function, and may be easily incorporated into a liquid-crystal display device. In addition, the polymer film for the third optically-anisotropic layer may serve as the protective film of the polarizing element, and the plate structure therefore contributes toward reducing the thickness of liquid-crystal display devices.

(Polarizing Element)

The linear polarizing film may be selected from coating-type polarizing films as typified by Optiva Inc., iodine-based polarizing films and dichroic-dye based polarizing films. Iodine or dichroic dye molecules are oriented in binder so as to have a polarizing capability. Iodine or dichroic dye molecules may be oriented along with binder molecules, or iodine molecules may aggregate themselves in the same manner of liquid crystal and be aligned in a direction.

Generally, commercially available polarizing films are produced by soaking a stretched polymer film in a solution of iodine or dichroic dye and impregnating the polymer film with molecules of iodine or dichroic dye.

Generally, molecules of iodine or dichroic dye may enter into a polymer film from the surface of the film and may be dispersed in the area about 4 μm in thickness from the surface of the film (about 8 μm in thickness from both of two surfaces of the film). And in order to obtain sufficient polarizing ability, it is required to use a polarizing film having a thickness not less than 10 μm. The penetrance degree can be adjusted within a preferred range by iodide or dichroic dye concentration of the solution, temperature of the solution or soaking time.

The thickness of is not greater than those of commercially available polarizing films (about 30 μm), more desirably not greater than 25 μm and much more desirably not greater than 20 μm. When a polarizing film having a thickness not greater than 20 μm is used in a 17-inch liquid-crystal display, no light leakage may be observed.

The polarizing film may comprise crosslinked binder. Self-crosslinkable polymers may be used as binder. The polarizing film may be produced by carrying out reaction between functional groups of polymer with light, heat or variation of pH. Crosslinking agents, which are compounds having high reaction-activities, may be used.

Crosslinking reactions may be carried out by heating a coating liquid comprising polymer or a mixture of polymer and a crosslinking agent after being applied to a substrate. The heating step may be carried out at any time by the end of the process for producing the polarizing film as long as a final product having good durability can be obtained.

Polymer to be used in the polarizing film as a binder may be either of a polymer intrinsically crosslinkable itself, or a polymer crosslinkable by a crosslinking agent.

Examples of the polymer include polymers such as polymethyl methacrylate, polyacrylates, polymethacrylates, polystyrene, polyvinyl alcohol and modified polyvinyl alcohol, poly(N-methylol acrylamide), polyvinyltoluene, chlorosulfonated polyethylene, nitrocellulose, chlorinated polyolefin, polyester, polyimide, poly(vinyl acetate), polyethylene, carboxy methylcellulose, polypropyrene, and polycarbonate; and copolymers thereof (e.g., acrylate/methacrylate copolymer, styrene/maleimide copolymer, styrene/vinyltoluene copolymer, and vinyl acetate/vinyl chloride copolymer). Silane coupling agents are also employable.

Among these polymes, water-soluble polymers (e.g., poly (N-methylol acrylamide), carboxymethyl cellulose, gelatin, polyvinyl alcohol and modified polyvinyl alcohol) are preferred. Gelatin, polyvinyl alcohol and modified polyvinyl alcohol are more preferred, and polyvinyl alcohol and modified polyvinyl alcohol are even more preferred.

The degree of saponification of the modified or non-modified polyvinyl alcohol to be used in the invention is preferably 70 to 100%, more preferably from 80 to 100%, and even more preferably from 95 to 100%. The degree of polymerization of the polyvinyl alcohol to be used in the invention is preferably from 100 to 5000.

Examples of the modified polyvinyl alcohol include those modified by copolymerization, chain transfer, or block polymerization. Examples of modifier group involved in the modification by copolymerization include —COONa, —Si (OX)$_3$ where X is a hydrogen atom or alkyl), —N(CH$_3$)$_3$.Cl, —C$_9$H$_{19}$, —COO, —SO$_3$Na and —C$_{12}$H$_{25}$. Examples of modifier group involved in the modification by chain transfer include —COONa, —SH and —SC$_{12}$H$_{25}$.

The degree of polymerization of the modified polyvinyl alcohol to be used in the invention is preferably from 100 to 3000. Preferable examples of the modified polyvinyl to be used in the invention include those described in JPA Nos. hei 8-338913 and hei 9-152509. Among those, non-modified or modified polyvinyl alcohols of which degree of saponification is from 85 to 95% are especially preferred. Any combination of two ore more types of non-modified or modified polyvinyl alcohols is employable.

Examples of the crosslinking agent are described in U.S. Pat. No. 23,297. Boron compounds such as boric acid or pyroborate can be used as a crosslinking agent. The amount of the crosslinking agent is desirably from 0.1 to 20% by mass and more desirably from 0.5 to 15% by mass with respect to the mass of binder. When the amount falls within the range, good alignment ability of molecules of iodine and dichroic dye and good moisture-heat resistance can be obtained. The polarizing film may contain some amount of unreacted crosslinking agents after end of crosslinking reaction. The amount of residual crosslinking agent in the polarizing film is desirably not greater than 1.0% by mass and more desirably not greater than 0.5% by mass. When the amount falls within the range, the polarization degree may not lower even if the polarizing film is used for a long period or is left under a high-humidity and high-temperature atmosphere for a long period.

Examples of dichroic dye include azo dyes, stilbene dyes, pyrazolone dyes, triphenylmethane dyes, quinoline dyes, oxazine dyes, thiazine dyes and anthraquinone dyes. The dichroic dye is desirably selected from water-soluble dyes. The dichroic dye desirably has a hydrophilic group such as sulfo, amino or hydroxy.

More specific Examples of dichroic dye include C.I. Direct•Yellow 12, C.I. Direct•Orange 39, C.I. Direct•Orange 72, C.I. Direct•Red 39, C.I. Direct•Red 79, C.I. Direct•Red 81, C.I. Direct•Red 83, C.I. Direct•Red 89, C.I. Direct•Violet 48, C.I. Direct•Blue 67, C.I. Direct•Blue 90, C.I. Direct•Green 59 and C.I. Acid•Red 37.

Dichroic dyes to be used in the invention are described in detail in JPA Nos. hei 1-161202, hei 1-172906, hei 1-172907, hei 1-183602, hei 1-248105, hei 1-265205 and hei 7-261024.

Dichroic dye may be used as a free acid or a salt (e.g., salts of alkali metal, ammonium salts and amine salts). Various colored polarizing films may be prepared by using two or more types of dichroic dyes. Polarizing films or plates may comprise a compound, dye or dichroic dye, so that, being disposed so that their transmission axes are perpendicular to each other, they can provide a black state. Such polarizing films or plates are excellent in terms of single-plate transmission and polarization degree, and are preferable.

The polarizing film is preferably prepared as follows: a polymer film is stretched in the long direction, MD direction, and then is stained with iodine or dichroic dye.

According to the stretching method, the stretching ratio is desirably from 2.5 to 3.0 and more desirably from 3.0 to 10.0. The stretching process may be carried out under dried atmosphere, pr in other words according to a dry stretching. Or the stretching process may be carried out while being dipped in water, or in other words according to a wet stretching. For the dry stretching, the stretching ratio is desirably from 2.5 to 5.0, and for the wet stretching, the stretching ratio is desirably from 3.0 to 10.0. The stretching process may be divided into plural steps including an obliquely stretching step. Dividing into plural steps, it is possible to stretch uniformly even if the stretching ratio is high. Before an obliquely stretching step, a stretching in a width-direction or a stretching in a length-direction may be carried out slightly (with a degree preventing shrinkage in a width direction). Such stretching may be carried out in a manner of a tenter stretching employing biaxial-stretching steps at a left side and a right side respectively. The biaxial-stretching may be carried out according to a usual film formation process.

Preferably, on both surfaces of a polarizing film, protective films are disposed, and, as one of the protective films, an optical compensation film, which may be a part of a rolled up film, comprising the first, second and third optically anisotropic layers, is disposed. Examples of such lamination include a protective film/a polarizing film/the third optically anisotropic layer/the second optically anisotropic layer/the first optically anisotropic layer, and a protective film/a polarizing film/the third optically anisotropic layer/the second optically anisotropic layer/alignment layer/the second optically anisotropic layer.

However, the polarizing plate to be used in the invention is not limited to the examples, and a surface of the first optically anisotropic layer and a surface of the polarizing film may be bonded.

The surfaces may be stick to each other with adhesive. Examples of the adhesive include polyvinyl alcohol based polymers (e.g., modified polyvinyl alcohols having acetoacetyl group, sulfonic acid group, carboxyl group or oxyalkylene group) and solutions of boron compounds. Among these, polyvinyl alcohol based polymers are preferred.

The thickness of the dried adhesive layer is preferably from 0.01 to 10 µm, and more preferably from 0.05 to 5 µm.

For enhancing the contrast, the polarizing element to be used in the liquid crystal display device of the invention preferably exhibits the higher transmission value and the higher polarization degree.

The transmission value of the polarizing element to be used in the invention is preferably from 30 to 50%, more preferably from 35 to 50% and even more preferably from 40 to 50% for light having a wavelength of 550 nm.

The polarization degree of the polarizing element to be used in the invention is preferably from 09 to 100%, more preferably from 95 to 100% and even more preferable from 99 to 100% for light having a wavelength of 550 nm.

(Antireflection Layer)

The liquid-crystal display device of the invention may have an antireflection layer further outside the polarizing element on the side of the display panel. The polarizing plate may comprises an antireflection layer on its surface on the side of the display panel, and the antireflection layer may serve also as the protective layer for the polarizing element on the side of the display panel.

From the viewpoint of preventing the color shift to occur depending on the viewing angle to the liquid-crystal display device, it is desirable that the internal haze of the antireflection layer is at least 50%. Preferred examples of these are described in JPA Nos. 2001-33783, 2001-343646, 2002-328228.

(Front Scattering Layer)

The liquid-crystal display device of the invention may have a front scattering layer further outside the polarizing element on the side of the display panel. The front scattering layer is to contribute toward improving the viewing angle characteristics when the viewing angle is inclines in the vertical and horizontal directions. In an embodiment where the antireflection layer is disposed outside the polarizing element on the side of the display panel, the front scattering layer exhibits an especially high effect. The front scattering layer may be formed of a composition of fine particles dispersed in a binder. The fine particles may be inorganic particles or organic particles. Preferably, the difference in the refractive index between the binder and the fine particles is from 0.02 to 0.20 or so. The front scattering layer may additionally have a hard coat function. Regarding the front scattering layer usable in the invention, referred to are JPA No. hei 11-38208 where a front scattering coefficient is specifically defined; JPA No. 2000-199809 where the relative refractive index of transparent resin and fine particles is specifically defined to fall within a specific range; and JPA No. 2002-107512 where the haze value is defined to be at least 40%.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

1. Example 1

1.-1 Formation of Third Optically-Anisotropic Layer

<Preparation of Cellulose Acetate Solution A>

The following ingredients were put into a mixing tank and stirred under heat to dissolve them, thereby preparing a cellulose acetate solution A.

| Formulation of Cellulose Acetate Solution A | |
|---|---|
| Cellulose acetate having a degree of acetylation of 60.9% | 100 mas. pts. |
| Triphenyl phosphate | 7.8 mas. pts. |
| Biphenyldiphenyl phosphate | 3.9 mas. pts. |
| Methylene chloride | 300 mas. pts. |
| Methanol | 45 mas. pts. |

4 parts by mass of cellulose acetate having a degree of acetylation of 60.9% (linter), 25 parts by mass of a retardation enhancer mentioned below, 0.5 parts by mass of fine silica particles (mean particle size: 20 nm), 80 parts by mass of methylene chloride and 20 parts by mass of methanol were put into another mixing tank and stirred under heat to prepare a retardation enhancer solution.
Retardation Enhancer:

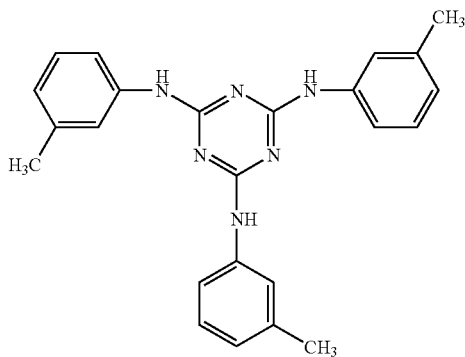

34.4 parts by mass of the retardation enhancer solution was mixed with 470 parts by mass of the cellulose acetate solution A and fully stirred to prepare a dope. The ratio by mass of the retardation enhancer to the cellulose acetate was 6.5%. The film having a residual solvent content of 35% by mass was peeled away from the band, and then at a temperature of 140° C., the film was conveyed using a tenter, while kept unstretched, and then the clips were removed, and the film was dried at 130° C. for 45 seconds, thereby forming a third optically-anisotropic layer in the form of a film. Thus formed, the residual solvent content of the third optically-anisotropic layer was 0.2% by mass, and the thickness thereof was 92 µm.
<Determination of Optical Characteristics>

The third optically-anisotropic layer was analyzed for the value Re at a wavelength of 550 nm, using an automatic birefringence meter KOBRA-21ADH (by Oji Scientific Instruments). With the in-plane slow axis taken as a tilt axis, Re at a tilt angle of +40° or −40° was determined. The results are shown in Table 1.

With the film thickness and the refractive index in the slow axis direction, nx, taken as parameters, the refractive index in the fast axis direction, ny, and the refractive index in the thickness direction, nz, were calculated so as to fit with the found data of Re(550), Re[+40°] and Re[−40°], and Rth was thereby determined. The results are shown in Table 1.

1.-2 Formation of Second Optically-Anisotropic Layer

<Preparation of Cellulose Acetate Solution B>

The following ingredients were put into a mixing tank and stirred under heat to dissolve them, thereby preparing a cellulose acetate solution B.

| Formulation of Cellulose Acetate Solution B | |
|---|---|
| Cellulose acetate having a degree of acetylation of 60.9% | 100 mas. pts. |
| Triphenyl phosphate | 7.8 mas. pts. |
| Biphenyldiphenyl phosphate | 3.9 mas. pts. |
| Methylene chloride | 300 mas. pts. |
| Methanol | 45 mas. pts. |

18.5 parts by mass of the above-mentioned retardation enhancer solution was mixed with 470 parts by mass of the cellulose acetate solution B and fully stirred to prepare a dope. The ratio by mass of the retardation enhancer to the cellulose acetate was 3.5%. The film having a residual solvent content of 35% by mass was peeled away from the band, and then at a temperature of 140° C., the film was stretched at a draw ratio of 38% using a tenter, and then the clips were removed, and the film was dried at 130° C. for 45 seconds, thereby forming a second optically-anisotropic layer in the form of a film. Thus formed, the residual solvent content of the cellulose acetate film was 0.2% by mass, and the thickness thereof was 88 µm.
<Determination of Optical Characteristics>

The thus-formed second optically-anisotropic layer was analyzed for the value Re at a wavelength of 550 nm, using an automatic birefringence meter KOBRA-21ADH (by Oji Scientific Instruments). With the in-plane slow axis taken as a tilt axis, Re at a tilt angle of +40° or −40° was determined. The results are shown in Table 1.

With the film thickness and the refractive index in the slow axis direction, nx, taken as parameters, the refractive index in the fast axis direction, ny, and the refractive index in the thickness direction, nz, were calculated so as to fit with the found data of Re(550), Re[+40°] and Re[−40°], and Rth was thereby determined. The results are shown in Table 1.

1.-3 Formation of First Optically-Anisotropic Layer

<Saponification of Second Optically-Anisotropic Layer>

An isopropyl alcohol solution of 1.5 N sodium hydroxide was applied to one surface of the second optically-anisotropic layer formed in the above, in an amount of 25 ml/m², then left at 25° C. for 5 seconds, washed with running water for 10 seconds, and then air at 25° C. was jetted to it to dry the surface of the film. In that manner, only one surface of the second optically-anisotropic layer was saponified.
<Formation of Alignment Film>

On one surface of the saponified second optically-anisotropic layer, a coating liquid for alignment film having the composition mentioned below was applied in an amount of 24 ml/m², using a wire bar coater of #14. This was dried with hot air at 60° C. for 60 seconds and then with hot air at 90° C. for 150 seconds.

Next, in the direction at 45° from the stretching direction of the second optically-anisotropic layer (this is nearly the same as the slow axis direction), the formed film was rubbed.

| Formulation of Coating Liquid for Alignment Film | |
| --- | --- |
| Modified polyvinyl alcohol mentioned below | 10 mas. pts. |
| Water | 371 mas. pts. |
| Methanol | 119 mas. pts. |
| Glutaraldehyde (crosslinking agent) | 0.5 mas. pts. |

Modified Polyvinyl Alcohol:

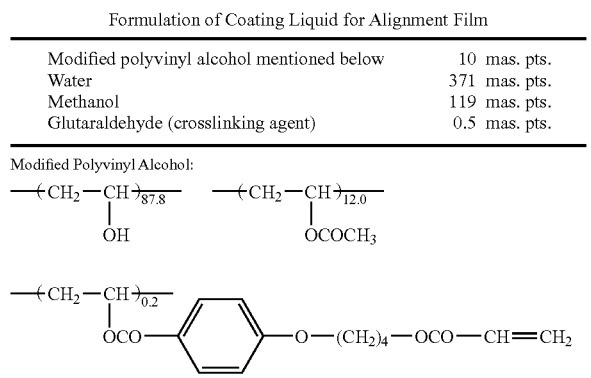

<Method 1 for Preparing First Optically-Anisotropic Layer>

91 parts by mass of a discotic compound mentioned below, 9 parts by mass of ethylene oxide-modified trimethylolpropane triacrylate (V#360, by Osaka Organic Chemical), 0.5 parts by mass of cellulose acetate butyrate (CAB531-1, by Eastman Chemical), 3 parts by mass of a photopolymerization initiator (Irgacure 907, by Ciba-Geigy) and 1 part by mass of a sensitizer (Kayacure DETX, by Nippon Kayaku) were dissolved in 204.0 parts by mass of methyl ethyl ketone to prepare a coating liquid.

Using a wire bar of #3.2, the coating liquid was applied onto the alignment film in an amount of 5.52 ml/m². This was fitted to a metal frame, and heated in a thermostat at 130° C. for 2 seconds to thereby align the discotic compound.

Next, using a high-pressure mercury lamp of 120 W/cm at 90° C., this was irradiated with UV rays for 4 minutes to thereby polymerize the discotic compound. Then, this was left cooled to room temperature. In that manner, a first optically-anisotropic layer was formed, thereby fabricating an optical film.

Discotic Liquid-Crystal Compound:

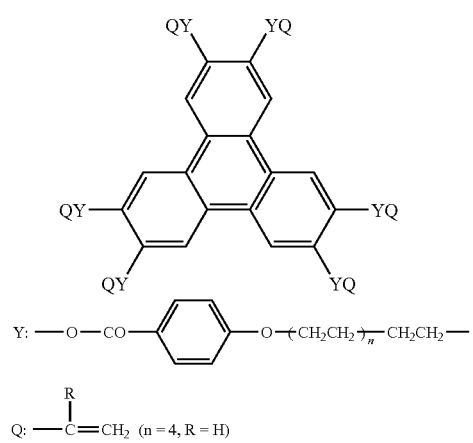

The thus-formed first optically-anisotropic layer was analyzed for the value Re at a wavelength of 550 nm, using an automatic birefringence meter KOBRA-21ADH (by Oji Scientific Instruments).

With the in-plane slow axis taken as a tilt axis, Re at a tilt angle of +40° or −40°, Re[+40°] and Re[−40°] were determined. The results are shown in Table 1.

1.-4 Fabrication of Elliptically Polarizing Plate

Iodine was adsorbed by the stretched polyvinyl alcohol film to form a polarizing film. Next, the side of the third optically-anisotropic layer of the formed optical film was stuck to one side of the polarizing film, using a polyvinyl alcohol adhesive. These were so disposed that the slow axis of the third optically-anisotropic layer could be in parallel to the transmission axis of the polarizing film. Next, the surface of the third optically-anisotropic layer was stuck to the surface of the second optically-anisotropic layer of the optical film, using an adhesive, thereby fabricating a laminate comprising the polarizer, the third optically-anisotropic layer (TAC film), the second optically-anisotropic layer (TAC film) and the first optically-anisotropic layer (optically-anisotropic layer formed of liquid-crystal composition).

A commercially-available cellulose triacetate film (Fujitac TD80UF, by FUJIFILM) was saponified in the same manner as above, and using a polyvinyl alcohol adhesive, this was stuck to the opposite side of the polarizing film (the side to which the third optically-anisotropic layer was not stuck). In that manner, an elliptically polarizing plate was fabricated.

1.-5 Preparation of Send Alignment Liquid-Crystal Cell

A polyimide film serving as an alignment film was formed on an ITO electrode-having glass substrate, and the alignment film was rubbed. Thus obtained, two glass substrates were combined in such a manner that the rubbing direction of the two could be in parallel to each other, and the cell gap was 6.8 μm. A liquid-crystal compound (ZLI1132, by Merck) having Δn of 0.1396 was injected into the cell gap, thereby fabricating a bend alignment liquid-crystal cell A. Δnd of the liquid-crystal cell A was about 950 nm.

1.-6 Preparation of Construction of Liquid-Crystal Display Device

The above bend alignment liquid-crystal cell A and the above one pair of polarizers were combined to construct a liquid-crystal display device.

The liquid-crystal cell A and the pair of polarizers were disposed as follows: The first optically-anisotropic layer of the polarizer and the substrate of the liquid-crystal cell A face each other, and the rubbing direction of the liquid-crystal cell is antiparallel to the rubbing direction of the first optically-anisotropic layer that faces the cell.

With the formed liquid-crystal cell A sandwiched therebetween, the polarizers were stuck to other transparent substrates on the viewers' side and the backlight side thereof.

These were disposed as follows: The first optically-anisotropic layer of the polarizer faces the transparent substrate, and the rubbing direction of the liquid-crystal cell A is antiparallel to the rubbing direction of the first optically-anisotropic layer that faces the cell. In that manner, a liquid-crystal display device was constructed in which the size of the liquid-crystal cell A is 20 inches.

1.-7 Evaluation of Liquid-Crystal Display Device

Thus constructed, the liquid-crystal display device was evaluated for the production aptitude, the transmittance and the contrast viewing angle.

<Evaluation for Production Aptitude>

The liquid-crystal display device was evaluated for the production aptitude according to the following evaluation standards, using a haze meter (NDH2000, by Nippon Denshoku).

Evaluation Standards
  A: Haze is extremely low.
  B: Haze is low.
  C: Haze is average.
  D: Haze is high.

<Evaluation for Contrast Viewing Angle>

In an environment at 25° C. and 60% RH, the constructed liquid-crystal display device was mounted on a backlight, and a 55 Hz square wave voltage was applied to the bend alignment liquid-crystal cell.

With controlling the voltage level, the voltage that gave the lowermost black brightness (front brightness) was determined, using a brightness meter (BM-5, by TOPCON).

Next, also using the same brightness meter, the black brightness and the white brightness (front brightness) in the center of the panel were determined, and the contrast viewing angle was evaluated based on the following evaluation standards. The results are shown in Table 1.

Evaluation Standards
  A: Excellent.
  B: Good.
  C: Average.
  D: Bad.

<Evaluation for Viewing Angle Margin>

The viewing angle (CR>10) fluctuation relative to the Re and Rth fluctuation of film was traced. On the basis of Comparative Example 4 (prior-art, having two optically-anisotropic layers), the samples were evaluated according to the standards mentioned below. The results are shown in Table 1.

Evaluation Standard
  A: Better than Comparative Example 4.
  B: Comparable to Comparative Example 4.
  C: Somewhat worse than Comparative Example 4.
  D: Much worse than Comparative Example 4.

2. Examples 2 to 9

OCB-mode liquid-crystal display devices were produced and evaluated in the same manner as in Example 1, for which, however, the TAC film used as the second optically-anisotropic layer and/or the TAC film used as the third optically-anisotropic layer were replaced with the TAC films having the properties shown in Table 1.

Re and Rth of the TAC films were controlled by changing the condition in biaxial stretching treatment.

3. Example 10

An OCB-mode liquid-crystal display device was produced and evaluated in the same manner as in Example 1, for which, however, the discotic liquid-crystal of the first optically-anisotropic layer was replaced with a rod-like liquid-crystal NG-1 shown below, and the TAC film used for the second optically-anisotropic layer and the TAC film used for the third optically-anisotropic layer were replaced with the TAC films having the properties shown in Table 1.

4. Comparative Examples 1 to 4

Comparative Examples 1 and 2

OCB-mode liquid-crystal display devices were produced and evaluated in the same manner as in Example 1, for which, however, the first optically-anisotropic layer did not satisfy the above-mentioned condition (3) or (4), and TAC films having the properties shown in Table 2 were used for the second and third optically-anisotropic layers.

Comparative Example 3

An OCB-mode liquid-crystal display device was produced and evaluated in the same manner as in Example 1, for which, however, a TAC film not satisfying the above-mentioned condition (5) was used for the second optically-anisotropic layer.

Comparative Example 4

An OCB-mode liquid-crystal display device was produced and evaluated in the same manner as in Example 1, for which, however, the TAC film for the third optically-anisotropic layer satisfying the above condition (6) was not used and a TAC film having the properties shown in Table 2 was used for the second optically-anisotropic layer.

TABLE 1

|  |  | Example 1 | Example 2 | Example 3 | Example 4 | Example 5 |
|---|---|---|---|---|---|---|
| First Optically Anisotropic Layer | Material | Discotic Liquid Compound | | | | |
| | $Re_1$ (nm) | 30 | 30 | 30 | 30 | 30 |
| | $Re_1[+40°]/Re_1[-40°]$ | 5 | 5 | 10 | 10 | 10 |
| Second Optically Anisotropic Layer | Material | TAC | TAC | TAC | TAC | TAC |
| | $Re_2$ (nm) | 10 | 40 | 20 | 10 | 15 |
| | $Rth_2$ (nm) | 100 | 100 | 100 | 100 | 100 |
| | Nz factor | 11 | 3 | 6 | 11 | 7 |
| Third Optically Anisotropic Layer | Material | TAC | TAC | TAC | TAC | TAC |
| | $Re_3$ (nm) | 60 | 60 | 80 | 20 | 60 |
| | $Rth_3$ (nm) | 200 | 200 | 200 | 200 | 160 |
| | Nz factor | 4 | 4 | 3 | 11 | 3 |
| $Rth_2 + Rth_3$ (nm) | | 300 | 300 | 300 | 300 | 260 |
| $\Delta nd$ of Liquid crystal Layer | | 950 | 950 | 950 | 950 | 950 |
| Production Aptitude | First *1 | B | B | B | B | B |
| | Second *2 | B | B | B | B | B |
| | Third *3 | B | B | B | B | B |
| Viewing Angle | | B | C | B | B | B |
| Viewing Angle Margin | | B | C | B | B | B |

|  |  | Example 6 | Example 7 | Example 8 | Example 9 | Example 10 |
|---|---|---|---|---|---|---|
| First Optically Anisotropic Layer | Material | Discotic Liquid Compound | | | | rod-like *4 |
| | $Re_1$ (nm) | 30 | 35 | 40 | 40 | 40 |
| | $Re_1[+40°]/Re_1[-40°]$ | 10 | 10 | 10 | 15 | 15 |
| Second Optically Anisotropic Layer | Material | TAC | TAC | TAC | TAC | TAC |
| | $Re_2$ (nm) | 10 | 0.1 | 10 | 10 | 0.1 |
| | $Rth_2$ (nm) | 100 | 100 | 80 | 110 | 90 |
| | Nz factor | 11 | 1001 | 9 | 12 | 901 |
| Third Optically Anisotropic Layer | Material | TAC | TAC | TAC | TAC | TAC |
| | $Re_3$ (nm) | 60 | 60 | 60 | 40 | 40 |
| | $Rth_3$ (nm) | 500 | 210 | 230 | 190 | 210 |
| | Nz factor | 9 | 4 | 4 | 5 | 6 |
| $Rth_2 + Rth_3$ (nm) | | 600 | 310 | 310 | 300 | 300 |
| $\Delta nd$ of Liquid crystal Layer | | 950 | 950 | 950 | 950 | 950 |
| Production Aptitude | First *1 | B | B | B | B | B |
| | Second *2 | B | B | B | B | B |
| | Third *3 | B | B | B | B | B |
| Viewing Angle | | C | A | A | A | A |
| Viewing Angle Margin | | C | A | A | A | A |

*1 First Optically Anisotropic Layer
*2 Second Optically Anisotropic Layer
*3 Third Optically Anisotropic Layer
*4 Rod-like Liquid Crystal Compound

TABLE 2

|  |  | Comparative Example 1 | Comparative Example 2 | Comparative Example 3 | Comparative Example 4 |
|---|---|---|---|---|---|
| First Optically Anisotropic Layer | Material | Discotic Liquid Compound | | | |
| | $Re_1$ (nm) | 20 | 50 | 30 | 30 |
| | $Re_1[+40°]/Re_1[-40°]$ | 5 | 25 | 5 | 5 |
| Second Optically Anisotropic Layer | Material | TAC | TAC | TAC | TAC |
| | $Re_2$ (nm) | 0.1 | 0.1 | 100 | 40 |
| | $Rth_2$ (nm) | 100 | 100 | 100 | 200 |
| | Nz factor | 1001 | 1001 | 1.5 | 6 |
| Third Optically Anisotropic Layer | Material | TAC | TAC | TAC | — |
| | $Re_3$ (nm) | 60 | 60 | 60 | |
| | $Rth_3$ (nm) | 150 | 150 | 200 | |
| | Nz factor | 3 | 3 | 4 | |
| $Rth_2 + Rth_3$ (nm) | | 250 | 250 | 300 | 200 |
| $\Delta nd$ of Liquid crystal Layer | | 950 | 950 | 950 | 950 |
| Production Aptitude | First *1 | B | B | B | B |
| | Second *2 | B | B | B | B |
| | Third *3 | B | B | B | — |
| Viewing Angle | | D | B | D | B |
| Viewing Angle Margin | | B | D | D | C |

*1 First Optically Anisotropic Layer
*2 Second Optically Anisotropic Layer
*3 Third Optically Anisotropic Layer From the results in Table 1, it is understandable that the OCB-mode liquid-crystal display devices of Examples 1 to 10 all have good production aptitude and are all good in both the viewing angle characteristics and the viewing angle margin. In particular, it is understandable that, when the total Rth of the second and third optically-anisotropic layers is less than $\Delta nd/2$ of the liquid-crystal layer, then the viewing angle characteristics and the viewing angle margin can be more improved. The viewing angle characteristics and the viewing angle margin in Example 1 are all excellent as compared with those of Comparative Examples in Table (Comparative Examples 1 and 2 in which the first optically-anisotropic layer does not satisfy the above-mentioned condition (3) or (4); Comparative Example 3 in which the second optically-anisotropic layer does not satisfy the condition (5); and Comparative Example 4 which does not have a third optically-anisotropic layer satisfying the condition (6)). Regarding the second and third optically-anisotropic layers, it has been confirmed that in any case where the layers are individually single layers or they are in the form of plural laminates, the effect of the invention does not change.

5. Other Examples

Some elliptically polarizing plates and OCB-mode liquid-crystal display devices comprising the polarizing plates respectively were produced in the same manner as the method described above, except that each first optically anisotropic layer was prepared according to Method 2 for preparing first optically-anisotropic layer described below.

<Method 2 for Preparing First Optically-Anisotropic Layer>

A coating liquid was prepared by dissolving the ingredients shown bellow in 242 Kg of methylethylketone.

| | |
|---|---|
| Liquid Crystal Compound (1) | 91.0 mas. pts. |
| Liquid Crystal Compound (1) | 9.0 mas. pts. |
| Ethylene Oxide-modified trimethylolpropane triacrylate (V#360, by Osaka Organic Chemical) | 9.0 mas. pts. |
| Fluoroaliphatic-group containing polymer shown below | 1.0 mas. pts. |
| Photo-polymerization initiator (Irgacure 907, by Ciba-Geigy) | 3.0 mas. pts. |
| Sensitizer (Kayacure DETX, by Nippon Kayaku) | 1.0 mas. pts. |

The viscosity of the obtained coating liquid was measured by using a B-type viscometer, BL type, manufactured by Tokyo Keiki Kogyo Co., Ltd., and it was found 2.0 mPa·s.

The coating liquid was applied to a surface of the alignment layer with a #2.8 wire-bar. The coating amount was 4.8 mL/m². This was bonded with a metal frame and heated in a temperature-controlled bath at 120° C. for 90 seconds to align liquid crystal molecules. Next, using a high-pressure mercury lamp of 120 W/cm at 80° C., this was irradiated with UV rays for one minute to thereby polymerize molecules of the discotic compound. Then, an optically anisotropic layer was obtained.

The ingredients which are not mentioned in the table shown below were same as those mentioned above.

| No. | Liquid Crystal Compound (1) | Liquid Crystal Compound (2) |
|---|---|---|
| 1 | 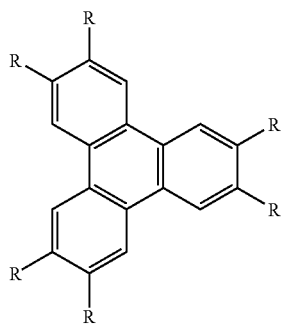<br>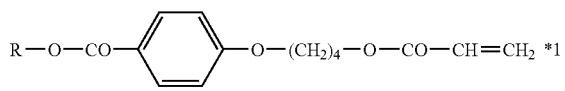 *1 | |
| 2 | | D-112<br>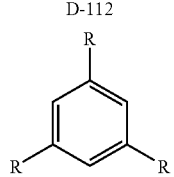<br>$R = $ 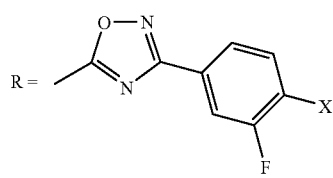<br>$X = \mathrm{-O(CH_2)_2CH(CH_3)OCOCH=CH_2}$ *2 |

-continued
| No. | Liquid Crystal Compound (1) | Liquid Crystal Compound (2) |
|---|---|---|
| 3 | D-112 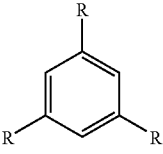 | 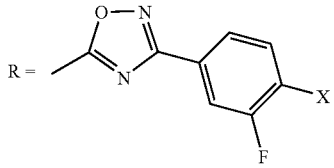 |
| 4 | D-304 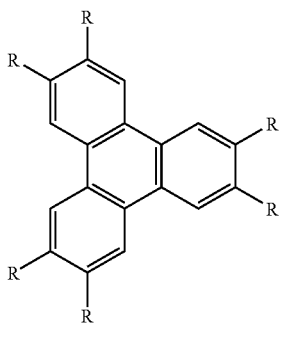 | 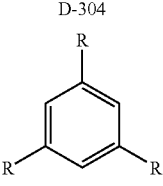 |
| 5 | D-224 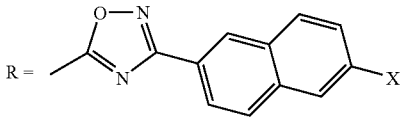 | 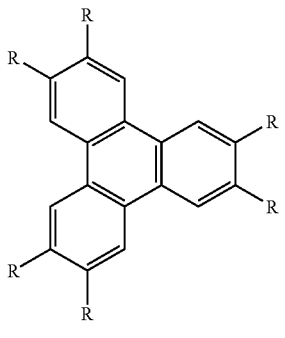 |

-continued
| No. | Liquid Crystal Compound (1) | Liquid Crystal Compound (2) |
|---|---|---|
| 6 | D-227 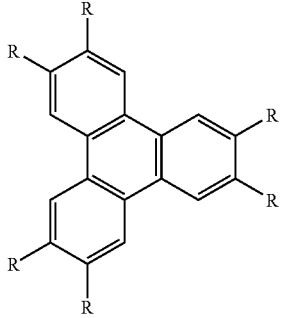 X = —COO(CH₂)₂OCOCH=CH₂ *3 | 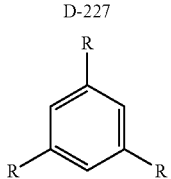 R—O—CO—⌬—O—(CH₂)₄—O—CO—CH=CH₂ *1 |
| 7 | D-10 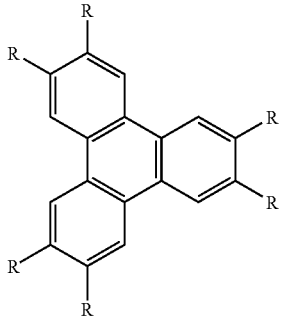 X = —O(CH₂)₅OCOCH=CH₂ *3 | 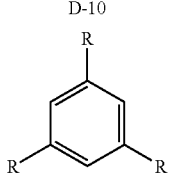 R—O—CO—⌬—O—(CH₂)₄—O—CO—CH=CH₂ *1 |
| 8 | D-286 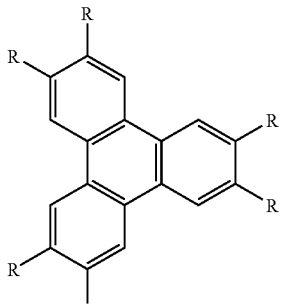 | 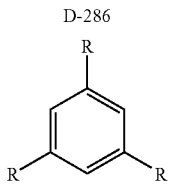 |

-continued

| No. | Liquid Crystal Compound (1) | Liquid Crystal Compound (2) |
|---|---|---|
| | $R = -\underset{\underset{O}{\|}}{C}-O-$ attached to phenyl-oxadiazole-phenyl-X; $X = -O(CH_2)_2OCOCH=CH_2$ *3 | $R-O-CO-\text{(phenyl)}-O-(CH_2)_4-O-CO-CH=CH_2$ *1 |

*1: described in JPA No. 2001-166144
*2: described in JPA No. 2006-76992
*3: described in JPA No. 2007-2220

Liquid crystal display device Nos. 1 to 8, produced according to the above mentioned method, achieved the nearly same results as those of examples shown in Table 1.

6. Examples 12 to 16

OCB-mode liquid-crystal display devices were produced and evaluated in the same manner as in the above Examples, for which, however, TAC films, COP films (cyclic olefin copolymer films (Mitsui Chemical's trade name, Apel), films prepared by optionally stretching them), COC films (norbornene films (JSR's trade name, Arton), films prepared by optionally stretching them), CAP films (prepared by stretching cellulose acetate propionate films) having the properties shown in Table 3 below were used as the second and third optically-anisotropic layers. They were left under high-temperature high-humidity conditions and checked for display unevenness, and thereby evaluated for the durability. "A" means no unevenness detection at all; "B" means some but negligible unevenness detection; "C" means unevenness detection; and "D" means remarkable unevenness detection.

7. Comparative Examples 5 to 8

OCB-mode liquid-crystal display devices were produced and evaluated in the same manner as in the above Examples, for which, however, the third optically-anisotropic layer satisfying the condition (6) was omitted.

TABLE 3

| | | Example 12 | Example 13 | Example 14 | Example 15 | Example 16 |
|---|---|---|---|---|---|---|
| First Optically Anisotropic Layer | Material | Discotic Liquid Compound | | | | |
| | $Re_1$ (nm) | 35 | 35 | 35 | 40 | 40 |
| | $Re_1[+40°]/Re_1[-40°]$ | 15 | 15 | 15 | 15 | 15 |
| Second Optically Anisotropic Layer | Material | TAC | TAC | TAC | TAC | TAC |
| | $Re_2$ (nm) | 10 | 10 | 10 | 40 | 40 |
| | $Rth_2$ (nm) | 100 | 100 | 100 | 250 | 200 |
| | Nz factor | 11 | 11 | 11 | 7 | 6 |
| Third Optically Anisotropic Layer | Material | TAC | COP | COC | COP | CAP |
| | $Re_3$ (nm) | 70 | 70 | 70 | 0.1 | 0.1 |
| | $Rth_3$ (nm) | 200 | 200 | 200 | 150 | 150 |
| | Nz factor | 3 | 3 | 3 | 1501 | 1501 |
| $Rth_2 + Rth_3$ (nm) | | 300 | 300 | 300 | 400 | 350 |
| Δnd of Liquid crystal Layer | | 950 | 950 | 950 | 950 | 950 |
| Production Aptitude | First *1 | B | B | B | B | B |
| | Second *2 | B | B | B | B | B |
| | Third *3 | B | B | B | B | B |
| Viewing Angle | | A | A | A | A | A |
| Viewing Angle Margin | | A | A | A | A | A |
| Durability | | C | B | A | B | C |

| | | Comparative Example | | | |
|---|---|---|---|---|---|
| | | 5 | 6 | 7 | 8 |
| First Optically Anisotropic Layer | Material | Discotic Liquid Compound | | | |
| | $Re_1$ (nm) | 40 | 40 | 40 | 40 |
| | $Re_1[+40°]/Re_1[-40°]$ | 15 | 15 | 15 | 15 |
| Second Optically Anisotropic Layer | Material | TAC | TAC | TAC | TAC |
| | $Re_2$ (nm) | 40 | 40 | 40 | 40 |
| | $Rth_2$ (nm) | 120 | 350 | 160 | 600 |
| | Nz factor | 4 | 9 | 5 | 16 |
| Third Optically Anisotropic Layer | Material | — | — | — | — |
| | $Re_3$ (nm) | | | | |
| | $Rth_3$ (nm) | | | | |
| | Nz factor | | | | |

TABLE 3-continued

| | | | | | |
|---|---|---|---|---|---|
| $Rth_2 + Rth_3$ (nm) | | 120 | 350 | 160 | 600 |
| Δnd of Liquid crystal Layer | | 950 | 950 | 950 | 950 |
| Production Aptitude | First *1 | B | B | B | B |
| | Second *2 | B | D | B | D |
| | Third *3 | — | — | — | — |
| Viewing Angle | | D | B | B | D |
| Viewing Angle Margin | | C | B | B | C |
| Durability | | C | C | C | C |

*1 First Optically Anisotropic Layer
*2 Second Optically Anisotropic Layer
*3 Third Optically Anisotropic Layer From the results in Table 3, it is understandable that the liquid-crystal display devices of Examples 12 to 16 are all excellent in both the viewing angle characteristics and the viewing angle margin, as compared with Comparative Examples (in which the third optically-anisotropic layer satisfying the condition (6) was omitted). Further, it is also understandable that the devices of Examples 13 to 15 in which a COP film or a COC film was used for the third optically-anisotropic layer are excellent in durability.

In comparative examples 6 and 8 where a second optically-anisotropic layer having high Rth is used in order that Rth of the third optically-anisotropic layer could be compensated by the second optically-anisotropic layer, thereby ensuring ($Rth_2+Rth_3$) on the same level as in Examples, a polymer film containing a large quantity of a retardation enhancer must be used for the second optically-anisotropic layer; but in those comparative examples, it is known that the additive increases the haze of the film, thereby depressing the production aptitude.

8. Examples 17 to 21

Comparative Examples 9 to 12

Various different liquid-crystal cells were produced in the same manner as that for the liquid-crystal cell A, in which, however, the thickness of the liquid-crystal layer was varied and therefore the liquid-crystal layer had a different value Δnd as in Table 4. Using these liquid-crystal cells, and using the polymer films shown in Table 4 for the second and third optically-anisotropic layers, OCB-mode liquid-crystal display devices were produced and evaluated in the same manner as in the above Examples. In addition, the transmittance of each device was determined according to the method mentioned below.

<Determination of Transmittance>

Using a brightness meter (BM-5, by TOPCON), the brightness of each produced liquid-crystal display device was measured, and was thereby evaluated for the transmittance. The evaluation results are shown in Table 4.

Evaluation Standards

A: Brightest.

B: Bright.

C: Average.

D: Dark.

TABLE 4

| | | Example 17 | Example 18 | Example 19 | Example 20 | Example 21 |
|---|---|---|---|---|---|---|
| First Optically Anisotropic Layer | Material | Discotic Liquid Compound | | | | |
| | $Re_1$ (nm) | 35 | 35 | 35 | 35 | 35 |
| | $Re_1[+40°]/Re_1[-40°]$ | 10 | 10 | 10 | 10 | 10 |
| Second Optically Anisotropic Layer | Material | TAC | TAC | TAC | TAC | TAC |
| | $Re_2$ (nm) | 10 | 10 | 10 | 10 | 10 |
| | $Rth_2$ (nm) | 190 | 160 | 100 | 170 | 190 |
| | Nz factor | 20 | 17 | 11 | 18 | 20 |
| Third Optically Anisotropic Layer | Material | COP | COP | COP | COP | COP |
| | $Re_3$ (nm) | 60 | 60 | 70 | 200 | 300 |
| | $Rth_3$ (nm) | 170 | 170 | 200 | −30 | −80 |
| | Nz factor | 3 | 3 | 3 | 0.35 | 0.23 |
| $Rth_2 + Rth_3$ (nm) | | 360 | 330 | 300 | 140 | 110 |
| Δnd of Liquid crystal Layer | | 1,330 | 1,120 | 950 | 660 | 660 |
| Production Aptitude | First *1 | B | B | B | B | B |
| | Second *2 | B | B | B | B | B |
| | Third *3 | B | B | B | B | B |
| Viewing Angle | | A | A | A | A | A |
| Viewing Angle Margin | | A | A | A | A | A |
| Transmittance | | A | A | A | B | B |

TABLE 4-continued

| | | Comparative Example | | | |
|---|---|---|---|---|---|
| | | 9 | 10 | 11 | 12 |
| First Optically Anisotropic Layer | Material | Discotic Liquid Compound | | | |
| | $Re_1$ (nm) | 35 | 35 | 35 | 35 |
| | $Re_1[+40°]/Re_1[-40°]$ | 10 | 10 | 10 | 10 |
| Second Optically Anisotropic Layer | Material | TAC | TAC | TAC | TAC |
| | $Re_2$ (nm) | 10 | 10 | 0 | 0 |
| | $Rth_2$ (nm) | 80 | 80 | 350 | 350 |
| | Nz factor | 9 | 9 | 3501 | 3501 |
| Third Optically Anisotropic Layer | Material | COP | COP | COP | COP |
| | $Re_3$ (nm) | 275 | 275 | 300 | 300 |
| | $Rth_3$ (nm) | −30 | −30 | −80 | −80 |
| | Nz factor | 0.39 | 0.39 | 0.23 | 0.23 |
| $Rth_2 + Rth_3$ (nm) | | 50 | 50 | 270 | 270 |
| Δnd of Liquid crystal Layer | | 500 | 450 | 1,330 | 1,400 |
| Production Aptitude | First *1 | B | B | B | B |
| | Second *2 | B | B | D | D |
| | Third *3 | B | B | B | B |
| Viewing Angle | | A | A | A | A |
| Viewing Angle Margin | | A | A | A | A |
| Transmittance | | C | D | B | B |

*1 First Optically Anisotropic Layer
*2 Second Optically Anisotropic Layer
*3 Third Optically Anisotropic Layer From the results in Table 4, it is understandable the liquid-crystal display devices of Examples 17 to 21 are all excellent both in the viewing angle characteristics and in the viewing angle margin, and they all have high transmittance.

On the other hand, the devices of Comparative Examples 9 and 10 had low transmittance since Δnd was not more than 500 nm. The devices of Comparative Examples 11 and 12 were comparable to those of Examples in point of the viewing angle characteristics, the viewing angle margin and the transmittance; but in these, Rth of the second optically-anisotropic layer must be at least 350 nm in order to compensate the liquid-crystal layer having Δnd of more than 1300 nm. It has been known that, when Rth of more than 300 nm was realized in a TAC film, the surface condition of the film was poor (in that the film thickness is uneven), and the production aptitude of the film worsened.

9. Preparation of Coating Liquid for Front Scattering Layer

In the liquid-crystal display devices constructed in the above Examples, a front light-scattering layer is formed on the side of the display panel of the polarizer disposed on the side of the display panel, according to the method mentioned below, whereby the viewing angle characteristics of the devices could be further more improved.

100 parts by mass of a silica ultrafine particles dispersion-containing hard coat liquid (DeSolite 27526, by JSR, having a refractive index of 1.51), 25 parts by mass of crosslinked polystyrene beads (Soken Chemical's XS130H, having a grain size of 1.3 μm and a refractive index of 1.61) and 6 parts by mass of crosslinked polystyrene beads (Soken Chemical's XS350H, having a grain size of 3.5 μm and a refractive index of 1.61) were mixed in methyl ethyl ketone/methyl isobutyl ketone (20/80 by mass) to prepare a coating liquid having a solid content of 45%.

The coating liquid was applied onto the surface of the outer protective film (commercially-available cellulose triacetate film (Fujitac TD80UF, by FUJIFILM)) of the polarizer disposed on the side of the display panel, in an amount to give a dry film thickness of 4.0 μm, then the solvent was dried away, and using a 160 W/cm air-cooling metal halide lamp (by Eyegraphics), this was irradiated with UV rays at an illuminance of 400 mW/cm² and at a dose of 300 mJ/cm², thereby curing the coating layer to form a front scattering layer. Owing to the action of the front scattering layer, the viewing angle characteristics of the liquid-crystal display devices of Examples could be more improved.

INDUSTRIAL APPLICABILITY

The liquid-crystal display device of the invention has high production aptitude and ensures a suitable viewing angle and has high transmittance, and therefore it is favorably used in car navigation systems, instrumental panels, game appliances in rear seats, head-up displays, etc.

CROSS-REFERENCE TO RELATED APPLICATIONS

This application claims benefit of priority under 35 USC 119 to Japanese Patent Application Nos. 2007-158313 filed on Jun. 15, 2007 and 2008-142053 filed on May 30, 2008; and the entire contents of the applications are incorporated herein by reference.

The invention claimed is:
1. A liquid-crystal display device comprising:
a liquid-crystal cell comprising a pair of transparent substrates and a liquid-crystal layer, disposed between said pair of transparent substrates, comprising liquid-crystal molecules; and
a first optically-anisotropic layer, a second optically-anisotropic layer, a third optically-anisotropic layer and a polarizing element as disposed on each side of the liquid-crystal cell in this order from the liquid-crystal cell;
which satisfies the following conditions (1) to (6):
(1) Δnd, where Δn is birefringence of the liquid-crystal layer under no driving voltage application thereto, and d is the thickness (nm) of the liquid-crystal layer, satisfies 500 nm<Δnd<1300 nm;

(2) the first optically-anisotropic layer comprises molecules aligned in the direction determined by an alignment axis and fixed in the alignment state, and the angle between the projection axes of the alignment axis and the transmission axis of either of the pair of polarizing elements, as projected on one plane, is from 40° to 50°;

(3) in-plane retardation (Re) of the first optically-anisotropic at a wavelength of 550 nm is from 20 to 50 nm;

(4) in-plane retardation, Re[+40°], of the first optically-anisotropic layer, as measured in a first direction inclined at 40° toward the layer plane of the first optically-anisotropic layer relative to the normal line of the layer, and in-plane retardation, Re[−40°], of the first optically anisotropic layer, as measured in a second direction inclined at 40° oppositely toward the layer plane of the first optically-anisotropic layer relative to the normal line of the layer from, satisfy the following formula (II) or (II'):

when Re[+40°]>Re[−40°] is satisfied, $$3 \leq Re[+40°]/Re[-40°] \leq 20 \quad \text{(II)}$$

when Re[+40°]<Re[−40°] is satisfied, $$3 \leq Re[-40°]/Re[+40°] \leq 20 \quad \text{(II')};$$

where the first and second directions are directions in a same plane that includes both of the normal line to the first optically anisotropic layer and an in-plane direction at 90° relative to the slow axis of in-plane retardation of the first optically-anisotropic layer;

(5) in-plane retardation (Re) of the second optically-anisotropic layer at a wavelength of 550 nm satisfies 0<|Re|≦40 nm, and the thickness-direction retardation (Rth) thereof at a wavelength of 550 nm satisfies 0 nm<Rth<(Δnd of liquid-crystal layer)/2;

(6) in-plane retardation (Re) of the third optically-anisotropic layer at a wavelength of 550 nm satisfies 0<|Re|≦300 nm, and the thickness-direction retardation (Rth) thereof at a wavelength of 550 nm satisfies −100 nm<Rth<(Δnd of liquid-crystal layer)/2.

2. The liquid-crystal display device of claim 1, wherein at least one of the first, second and third optically-anisotropic layers comprises two or more optically-anisotropic layers.

3. The liquid-crystal display device of claim 1, wherein the total of Rth of the second and third optically-anisotropic layers disposed on one side of the liquid-crystal cell is not more than Δnd of the liquid-crystal layer.

4. The liquid-crystal display device of claim 1, wherein Re at a wavelength of 550 nm of the second optically-anisotropic layer disposed on one side of the liquid-crystal cell is not more than Re at a wavelength of 550 nm of the third optically-anisotropic layer.

5. The liquid-crystal display device of claim 1, wherein the first optically-anisotropic layer comprises discotic liquid crystals and/or rod-like liquid crystals fixed in a hybrid alignment state.

6. The liquid-crystal display device of claim 1, wherein the first optically-anisotropic layer comprises at least one non-liquid-crystal polymer selected from a group consisting of polyamides, polyesters, polyether ketones, polyamidimides and polyester imides.

7. The liquid-crystal display device of claim 1, wherein at least one of the second and third optically-anisotropic layers is a cellulose acylate film, a cyclic olefin copolymer (COC) film, or a cyclic olefin polymer (COP) film.

8. The liquid-crystal display device of claim 1, wherein the liquid-crystal cell is a bend alignment-mode or vertical alignment-mode liquid-crystal cell.

9. The liquid-crystal display device of claim 1, wherein the first, second and third optically-anisotropic layers and the polarizing element are disposed as integrated as an elliptically polarizing plate.

10. The liquid-crystal display device of claim 9, wherein the elliptically polarizing plate is produced by sticking a rolled-up laminate of the polarizer and the third optically-anisotropic layer, and a rolled-up laminate of the first and second optically-anisotropic layers, in a mode of roll-to-roll processing operation.

11. The liquid-crystal display device of claim 1, further comprising a front scattering layer on the outer side of the polarizing element disposed on the displaying side.

* * * * *